US010155692B2

(12) United States Patent
Dubey et al.

(10) Patent No.: US 10,155,692 B2
(45) Date of Patent: Dec. 18, 2018

(54) HYDROPHOBIC FINISH COMPOSITIONS WITH EXTENDED FLOW TIME RETENTION AND BUILDING PRODUCTS MADE THEREOF

(71) Applicant: United States Gypsum Company, Chicago, IL (US)

(72) Inventors: Ashish Dubey, Grayslake, IL (US); Yanfei Peng, Gurnee, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 182 days.

(21) Appl. No.: 14/973,330

(22) Filed: Dec. 17, 2015

(65) Prior Publication Data

US 2016/0264787 A1 Sep. 15, 2016

Related U.S. Application Data

(60) Provisional application No. 62/133,216, filed on Mar. 13, 2015.

(51) Int. Cl.

| | | |
|---|---|---|
| C09D 1/00 | (2006.01) | |
| C04B 7/26 | (2006.01) | |
| C09D 5/00 | (2006.01) | |
| C04B 14/42 | (2006.01) | |
| C04B 28/14 | (2006.01) | |
| B32B 5/26 | (2006.01) | |
| B32B 13/08 | (2006.01) | |
| B28B 23/00 | (2006.01) | |
| B32B 29/00 | (2006.01) | |
| C04B 28/02 | (2006.01) | |
| C04B 41/00 | (2006.01) | |
| C04B 41/48 | (2006.01) | |
| C04B 41/63 | (2006.01) | |
| B28B 11/04 | (2006.01) | |
| E04C 2/04 | (2006.01) | |
| E04C 2/06 | (2006.01) | |
| B32B 13/14 | (2006.01) | |
| C04B 41/45 | (2006.01) | |
| C04B 41/50 | (2006.01) | |
| C04B 41/52 | (2006.01) | |
| C04B 41/70 | (2006.01) | |
| E04C 2/26 | (2006.01) | |
| E04F 15/18 | (2006.01) | |
| C04B 111/27 | (2006.01) | |
| C04B 111/00 | (2006.01) | |

(52) U.S. Cl.
CPC .............. *C04B 7/26* (2013.01); *B28B 11/046* (2013.01); *B28B 23/0006* (2013.01); *B32B 5/26* (2013.01); *B32B 13/08* (2013.01); *B32B 13/14* (2013.01); *B32B 29/005* (2013.01); *C04B 14/42* (2013.01); *C04B 28/021* (2013.01); *C04B 28/14* (2013.01); *C04B 41/009* (2013.01); *C04B 41/4501* (2013.01); *C04B 41/483* (2013.01); *C04B 41/5076* (2013.01); *C04B 41/52* (2013.01); *C04B 41/63* (2013.01); *C04B 41/70* (2013.01); *C09D 5/00* (2013.01); *E04C 2/043* (2013.01); *E04C 2/06* (2013.01); *E04C 2/26* (2013.01); *E04F 15/18* (2013.01); *B32B 2255/02* (2013.01); *B32B 2255/26* (2013.01); *B32B 2260/021* (2013.01); *B32B 2260/023* (2013.01); *B32B 2260/046* (2013.01); *B32B 2262/02* (2013.01); *B32B 2307/712* (2013.01); *B32B 2307/7265* (2013.01); *B32B 2307/73* (2013.01); *B32B 2419/04* (2013.01); *B32B 2419/06* (2013.01); *B32B 2607/00* (2013.01); *C04B 2111/00612* (2013.01); *C04B 2111/27* (2013.01); *Y02W 30/92* (2015.05); *Y02W 30/94* (2015.05)

(58) Field of Classification Search
CPC ....................................................... E04C 2/044
See application file for complete search history.

(56) References Cited

U.S. PATENT DOCUMENTS

| | | |
|---|---|---|
| 4,810,569 A | 3/1989 | Lehnert et al. |
| 5,112,678 A | 5/1992 | Gay et al. |
| 5,965,257 A | 10/1999 | Ahluwalia |
| 6,391,106 B2 | 5/2002 | Moreau et al. |
| 7,748,454 B2 | 7/2010 | Reddy et al. |
| 8,038,790 B1 | 10/2011 | Dubey et al. |
| 8,101,016 B2 | 1/2012 | Hou et al. |

(Continued)

FOREIGN PATENT DOCUMENTS

WO 2015031344 A1 3/2015

OTHER PUBLICATIONS

Gypsum Association (https://www.gypsum.org/technical/using-gypsum-board-for-walls-and-ceilings/using-gypsum-board-for-walls-and-ceilings-section-i/#fire)(date unkown).*

(Continued)

*Primary Examiner* — Kuo Liang Peng
(74) *Attorney, Agent, or Firm* — Vorys, Sater, Seymour and Pease LLP; Pradip Sahu; Philip T. Petti

(57) ABSTRACT

Disclosed are hydrophobic finish compositions and cementitious articles made with the hydrophobic finish compositions. In some embodiments, the article is a waterproof gypsum panel surface reinforced with inorganic mineral fibers that face a flexible and hydrophobic cementitious finish possessing beneficial waterproofing properties. The waterproof gypsum panels of the invention have many uses, such as, tilebacker board in wet or dry areas of buildings, exterior weather barrier panel for use as exterior sheathing, and roof cover board having water durability and low surface absorption. The flexible and hydrophobic cementitious finish can include fly ash, film-forming polymer, silane compound (e.g., alkyl alkoxysilane), an extended flow time retention agent including either one or more carboxylic acids, salts of carboxylic acids, or mixtures thereof, and other optional additives.

26 Claims, 7 Drawing Sheets

(56) References Cited

U.S. PATENT DOCUMENTS

| | | |
|---|---|---|
| 2002/0155282 A1 | 10/2002 | Randall et al. |
| 2003/0084980 A1 | 5/2003 | Seufert et al. |
| 2003/0172850 A1* | 9/2003 | Chun .................. C04B 24/06 106/823 |
| 2004/0154264 A1 | 8/2004 | Colbert |
| 2005/0103262 A1 | 5/2005 | Bush et al. |
| 2005/0266225 A1 | 12/2005 | Currier et al. |
| 2007/0042657 A1 | 2/2007 | Bush et al. |
| 2009/0011207 A1* | 1/2009 | Dubey ............... C04B 20/1051 428/219 |
| 2009/0275250 A1 | 11/2009 | Smith et al. |
| 2010/0087114 A1 | 4/2010 | Bush et al. |
| 2011/0008629 A1 | 1/2011 | Davidson et al. |
| 2012/0270969 A1 | 10/2012 | Bichler et al. |
| 2014/0261954 A1 | 9/2014 | Dubey et al. |
| 2014/0272402 A1* | 9/2014 | Dubey .................. B32B 13/14 428/339 |
| 2015/0064433 A1 | 3/2015 | Foster et al. |
| 2015/0197938 A1 | 7/2015 | Boydston et al. |

OTHER PUBLICATIONS

CGF, WEBTECH® Gypsum Wallboard Facer, Atlas Roofing Corporation, URL: < www.atlaswebtech.com>, retrieved from the Internet Mar. 5, 2016.

Gypsum Exterior Sheathing, ATLAS Facer Technology, URL: < www.atlasroofing.com/facers/gypsum/exterior-sheating>, retrieved from the Internet Mar. 3, 2016.

Safety Data Sheet, Atlas Web Technologies, Material Name: Coated Glass Mat, pp. 1-7, Issue Date: Feb. 7, 2014.

Material Safety Data Sheet, Gardz 16oz 4 pack Spray, Rust-Oleum Corp., Feb. 3, 2011.

Forton VF-774, Acrylic Co-Polymer for Use in GFRC, SMOOTH-ON, URL: <www.smooth-on.com>, retrieved from the Internet Mar. 6, 2016.

USG SECUROCK® Brand Glass-Mat Sheathing Regular and FIRECODE® X, United States Gypsum Co., Chicago, IL, 2015.

International Search Report and Written Opinion dated May 24, 2016 for International Application No. PCT/US2016/021970.

* cited by examiner

FIG. 3A
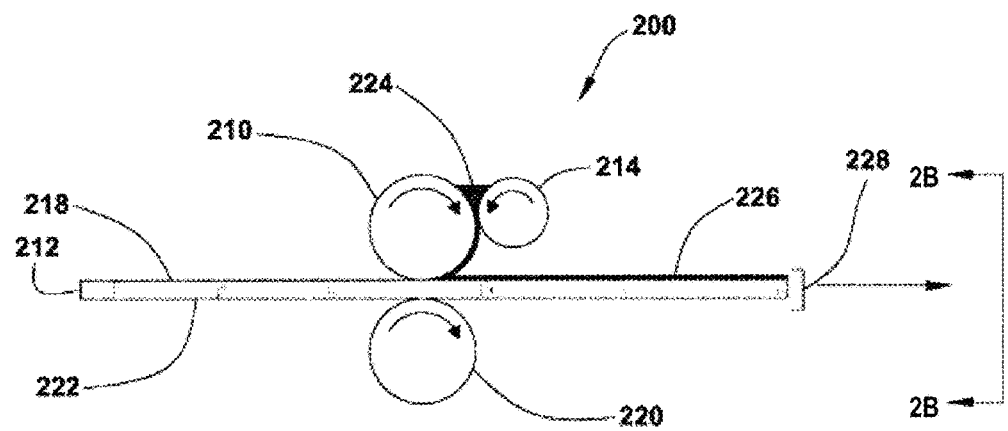
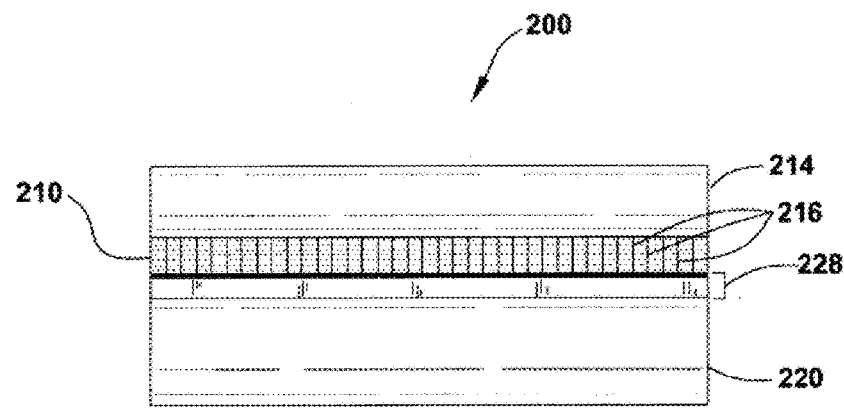
FIG. 3B
FIG. 4
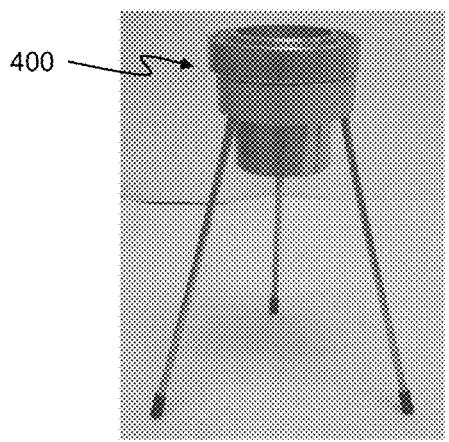

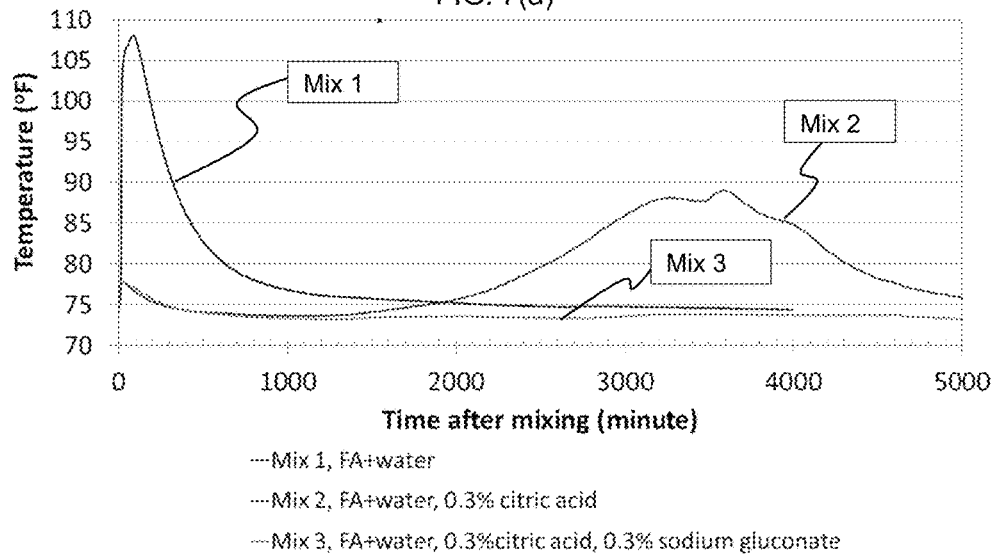
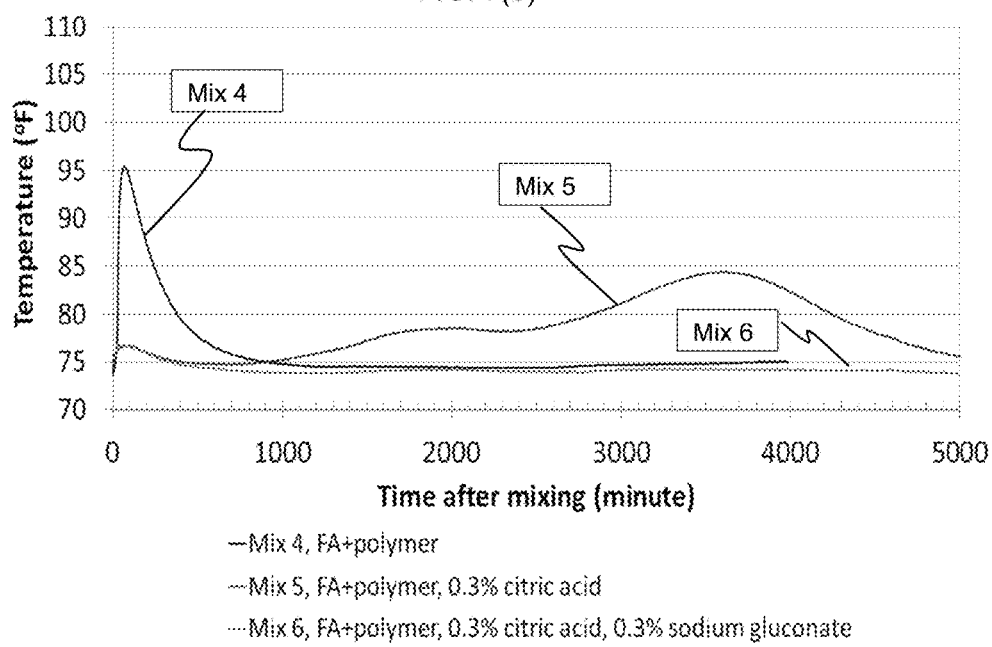

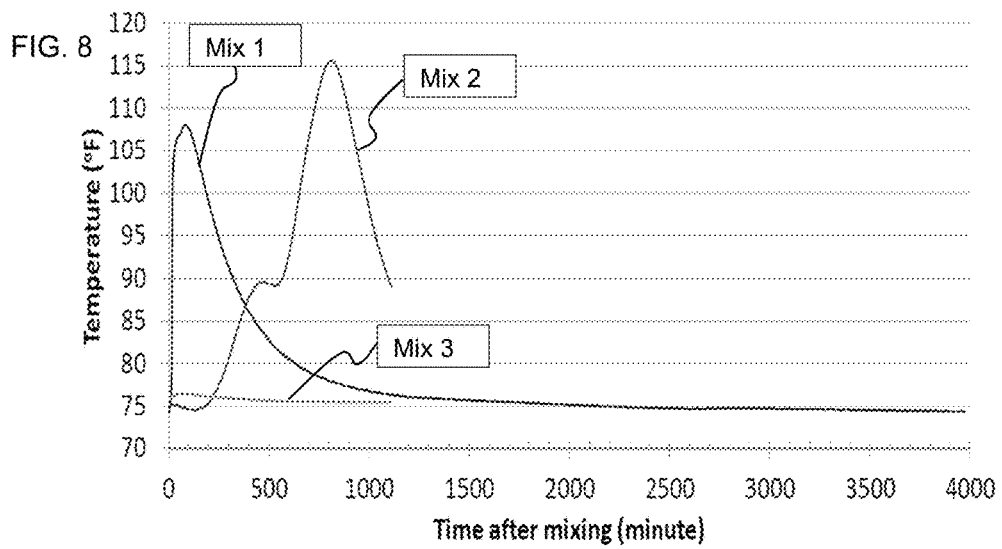
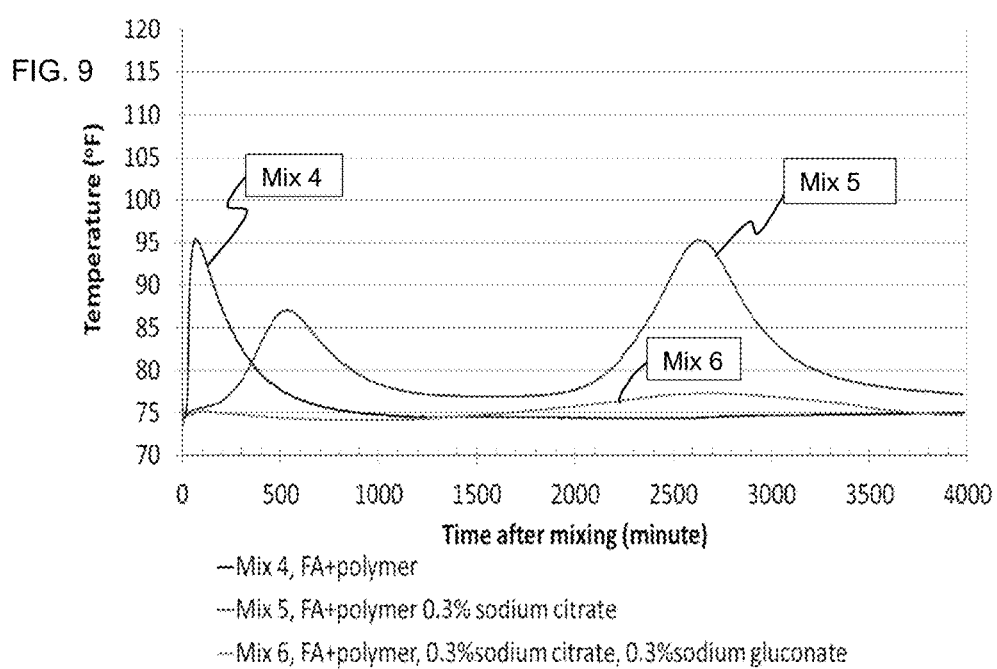

Mix 1 — 0.3%sodium citrate+0.3%sodium gluconate
Mix 3 — 0.3% citric acid+0.3%sodium gluconate
Mix 4 — 0.3%citric acid+0.15%potassium tartrate
Mix 2   not shown   0.3% potassium citrate + 0.3% potassium

HYDROPHOBIC FINISH COMPOSITIONS WITH EXTENDED FLOW TIME RETENTION AND BUILDING PRODUCTS MADE THEREOF

CROSS-REFERENCE TO RELATED APPLICATIONS

This claims the benefit of U.S. provisional patent application No. 62/133,216 filed on Mar. 13, 2015, incorporated herein by reference.

FIELD OF THE INVENTION

The invention relates generally to hydrophobic finish compositions and articles made with the said hydrophobic finish compositions. In some embodiments, the article is an inorganic cementitious panel that is surface reinforced with a fibrous mat coated with a hydrophobic finish possessing beneficial waterproofing properties. The hydrophobic finish composition comprises fly ash, film-forming polymer, silane, and an extended flow time retention agent comprising one or more carboxylic acids, salts of carboxylic acids, or mixtures thereof. The hydrophobic finish composition described herein could be used by itself or with other substrates or products in applications where it is important to have waterproofing properties.

BACKGROUND OF THE INVENTION

In construction applications it is important to protect building components from water intrusion and moisture related damage. Cementitious articles, such as gypsum board and cement board, are useful in a variety of applications, some of which require a degree of water resistance. Thus, for such applications, it is often desirable to use a cementitious article faced with a glass or polymer-based fiber mat instead of paper. It also is advantageous to use additives in the cementitious core that improve the water resistance of the core material itself. However, to improve water resistance the mat-faced gypsum board or cement board comprising, consisting of, or consisting essentially of gypsum-based core and fibrous mat is provided with a coating of hydrophobic finish. The fiber mat has an inner surface facing at least one face of the gypsum-based core and an outer surface opposite the inner surface. The hydrophobic finish faces the outer surface of the mat. The major components of the hydrophobic finish are Class C fly ash to promote bonding of finish materials, film-forming polymer and silane compound for water resistance.

However, a drawback of the hydrophobic finish is that it can stiffen too quickly and interfere with operation of industrial production equipment such as roller coasters.

Stiffening of the hydrophobic finish coating leads to buildup on the roller coater and slurry delivery system, which makes extended production run difficult. Further, buildup of coating material on the rollers makes it difficult to produce uniform coating with satisfactory application rate and product appearance.

It would also be desirable if the hydrophobic finish coating was capable of being applied to a substrate both in industrial manufacturing operations as well as in the field on construction job sites.

BRIEF SUMMARY OF THE INVENTION

In one aspect, the invention provides a hydrophobic finish composition comprising;
(i) hydraulic component comprising fly ash, preferably the fly ash comprises Class C fly ash, wherein the fly ash more preferably comprises Class C fly ash in an amount from about 50% to about 85% by weight of the finish composition on a water inclusive basis;
(ii) film-forming polymer;
(iii) at least one silane compound selected from the group consisting of:
(a) silane compounds having a molecular weight of at least about 150,
(b) silane compounds having a general chemical formula (I):

$(R^1O)_m$—Si—$X_{4-m}$                        (I)

wherein $R^1O$ is an alkoxy group, X is an organofunctional group, and m ranges from 1 to 3, and
(c) mixtures of silane compounds (a) and (b); and
(iv) an extended flow time retention agent comprising at least one member of the group consisting of carboxylic acids, salts of carboxylic acids, and mixtures thereof.

Thus, the present invention preferably provides a hydrophobic finish composition comprising a hydraulic component which comprises Class C fly ash, film-forming polymer, silane compound of the chemical formula (I):

$(R^1O)_m$—Si—$X_{4-m}$                        (I)

where $R^1O$ is an alkoxy group, preferably C1-C12 alkoxy, X is an organofunctional group, and m ranges from 1 to 3, and an extended flow time retention agent comprising either one or more carboxylic acids, salts of carboxylic acids, or mixtures thereof.

In another aspect, the invention provides a cementitious article comprising, consisting of, or consisting essentially of cementitious-based layer, and the above described hydrophobic finish composition. The hydrophobic finish composition comprises a hydraulic component which comprises:
(i) fly ash, preferably the fly ash comprises Class C fly ash, wherein the fly ash more preferably comprises Class C fly ash in an amount from about 50% to about 85% by weight of the finish composition on a water inclusive basis;
(ii) film-forming polymer;
(iii) at least one silane compound selected from the group consisting of:
(a) silane compounds having a molecular weight of at least about 150,
(b) silane compounds having a general chemical formula (I):

$(R^1O)_m$—Si—$X_{4-m}$                        (I)

wherein $R^1O$ is an alkoxy group, X is an organofunctional group, and m ranges from 1 to 3, and
(c) mixtures of silane compounds (a) and (b); and
(iv) an extended flow time retention agent comprising at least one member of the group consisting of carboxylic acids, salts of carboxylic acids, and mixtures thereof.

The hydrophobic finish composition faces an outer surface of the layer of the article. In some embodiments, the layer has two parts, with a finish on either side of the layer, to form a sandwich structure. The layer may be Portland cement based or gypsum based or any other inorganic cement based material.

In another aspect, the invention provides a mat-faced cementitious board comprising, consisting of, or consisting essentially of cementitious-based core, fibrous mat, and the above described hydrophobic finish composition. The hydrophobic finish composition comprises a hydraulic component which comprises:

(i) fly ash, preferably the fly ash comprises Class C fly ash, wherein the fly ash more preferably comprises Class C fly ash in an amount from about 50% to about 85% by weight of the finish composition on a water inclusive basis;
(ii) film-forming polymer;
(iii) at least one silane compound selected from the group consisting of:
(a) silane compounds having a molecular weight of at least about 150,
(b) silane compounds having a general chemical formula (I):

$(R^1O)_m-Si-X_{4-m}$ (I)

wherein $R^1O$ is an alkoxy group, X is an organofunctional group, and m ranges from 1 to 3, and
(c) mixtures of silane compounds (a) and (b); and
(iv) an extended flow time retention agent comprising at least one member of the group consisting of carboxylic acids, salts of carboxylic acids, and mixtures thereof.

The hydrophobic finish composition faces an outer surface of the layer. In some embodiments, the layer has two parts, with a finish on either side of the layer, to form a sandwich structure. The cementitious-based core may be Portland cement based or gypsum based or any other inorganic cement based material. The fiber mat has an inner surface facing at least one face of the cementitious-based core and an outer surface opposite the inner surface. The hydrophobic finish composition faces the outer surface of the mat, opposite the inner face that faces the cementitious-based core. The core is thicker than the finish. In some embodiments, the mat has two parts, with a mat on either side of the cementitious-based core, to form a sandwich structure. The term organofunctional group as used in the present specification is a substituted or unsubstituted organic (carbon-containing) moiety.

In another aspect, the invention provides a hydrophobic finish composition, cementitious article, and mat-faced cementitious board wherein, rather than specifying the silane of the hydrophobic finish composition, cementitious article, and mat-faced cementitious board as being a silane compound of the above-listed of the chemical formula (I), the silane is specified as a silane compound having a molecular weight of at least about 150 Daltons (e.g., at least about 175, at least about 200, or at least about 250).

Thus, for example, the present invention preferably provides a hydrophobic finish composition comprising a hydraulic component which comprises Class C fly ash, film-forming polymer, silane compounds having a molecular weight of at least about 150, and an extended flow time retention agent comprising one or more carboxylic acids, salts of carboxylic acids, or mixtures thereof.

Optionally the invention provides a hydrophobic finish composition, cementitious article, and mat-faced cementitious board wherein this silane is a silane of above-listed chemical formula (I) having a molecular weight of at least about 150 Daltons (e.g., at least about 175, at least about 200, or at least about 250).

The above described finish compositions can be applied in a wet state in some embodiments. The Class C fly ash is preferably present in an amount from about 50% to about 85% by weight of the wet finish composition. In the present specification, the term wet basis means a water inclusive basis. In other words based on weight of the total composition including water. The water may be added externally and/or it may come from the polymer dispersion when the polymer is added in a liquid form. Likewise the term wet state or wet composition means including water. In contrast, dry basis means a water free basis.

The hydrophobic finish composition preferably comprises the film-forming polymer in an amount from about 5% to about 25% by weight of the wet finish. The hydrophobic finish composition typically comprises the alkyl alkoxysilane of chemical formula (I) and/or having a molecular weight of at least about 150 Daltons (e.g., at least about 175, at least about 200, or at least about 250) in an amount of about 5% or less by weight of the wet finish. The hydrophobic finish composition typically comprises the extended flow time retention agent, which is at least one member of the group consisting of carboxylic acids, salts of carboxylic acid, and combinations thereof, in a total amount of 0.05 to 1.0 wt % of based upon dry (water free) weight of the hydraulic component.

Advantageously, hydrophobic finish coatings and products (e.g., cementitious panels or articles) according to embodiments of the invention exhibit one or more superior properties, such as water penetration resistance and/or impermeability; water durability and erosion resistance; bond with a variety of finishes, adhesives, and cementitious mortars; lower surface absorption resulting in significant reduction in usage of externally applied finishes and adhesives; aesthetics; and/or mold and mildew resistance.

BRIEF DESCRIPTION OF THE DRAWINGS

FIG. 3A is a schematic side view illustrating a roller assembly comprising a finish roller with circumferential grooves defined therein applying a hydrophobic finish composition to a mat-faced cementitious board with the assembly in a reverse finish orientation, in accordance with embodiments of the invention.
FIG. 3B is a front schematic view of the roller assembly taken alone the line 2B-2B depicted in FIG. 3A.
FIG. 4 shows a Sheen cup used in Example 1.
FIG. 7(a) shows temperature rise data for fly ash and water mixes of Example 3.
FIG. 7(b) shows temperature rise data for fly ash and polymer mixes of Example 3.
FIG. 8 shows temperature rise data for fly ash and water mixes of Example 4.
FIG. 9 shows temperature rise data for fly ash and polymer mixes of Example 4.

DETAILED DESCRIPTION OF THE INVENTION

Figure 1:
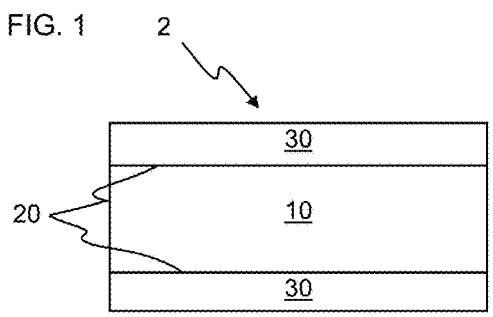
FIG. 1 illustrates a schematic diagram of a composite board of the present invention.

The present invention provides a hydrophobic finish comprising, consisting of, or consisting essentially of fly ash, film-forming polymer, silane compound, and an extended flow time retention agent comprising a member of the group consisting of carboxylic acids, salts of carboxylic acids, or mixtures thereof. Preferably the fly ash comprises Class C fly ash, wherein the fly ash more preferably comprises Class C fly ash in an amount from about 50% to about 85% by weight of the finish composition on a water inclusive basis.

The present invention is directed, at least in part, to improving water resistance in cementitious product, such as mat-faced board. Product according to the invention comprises, consists of, or consists essentially of cementitious core and the above-mentioned hydrophobic finish facing the core. The hydrophobic finish comprises, consists of, or consists essentially of fly ash, film-forming polymer, silane compound, and an extended flow time retention agent comprising a member of the group consisting of carboxylic acids, salts of carboxylic acids, or mixtures thereof. Preferably the fly ash comprises Class C fly ash, wherein the fly ash more preferably comprises Class C fly ash in an amount from about 50% to about 85% by weight of the finish composition on a water inclusive basis.

In some embodiments, product is board that comprises, consists of, or consists essentially of cementitious core (e.g., gypsum-based core), fibrous mat, and hydrophobic finish that faces an outer surface of the mat, where the mat has an inner surface that can face a gypsum core, and the outer surface is opposite the inner face. The term "faces," as used herein, means that other components may optionally be between the finish and mat, or between the mat and core, in accordance with embodiments of the invention (as defined herein). In some embodiments, the mat can be in at least two parts, with, for example, a mat on either side of the gypsum-based core to form a sandwich arrangement as known in the art. In embodiments where the mat has more than one part, at least one mat, and in some embodiments all mats, have hydrophobic finish facing the respective outer surfaces of the mat(s).

Furthermore, product according to the invention achieves water resistance and/or water barrier properties without compromising strength or flexibility of the product. Thus, product according to embodiments of the invention does not become too rigid or brittle, but rather achieves desirable mechanical properties such as nail-pull resistance, flexural strength, core hardness, end and edge hardness, surface water absorption, and/or humidified deflection in accordance with ASTM C1178. In addition, the shear bond strength of the panels of the invention (e.g., when bonded using set cement mortar or organic adhesive) exceeds about 50 psi when tested in accordance to the ASTM C1325 standard. This property is useful in some embodiments that can be used as substrates to bond ceramic tiles and stones using thin set cement mortars or organic adhesives.

Embodiments of the finish composition of the invention further exhibit surprising flexibility. The flexible nature of the cementitious finish composition is particularly useful in some embodiments in resisting formation of cracks and mechanical deterioration due to various factors during the life cycle of the product and possibly the building or structure containing the product. These factors include, for example, flexing of the panel during handling or installation; flexing and deformation of the panel due to externally applied loads; scratching the panel from construction equipment and tools such as mortar trowels, etc.; material shrinkage or expansion due to hygrothermal changes; water erosion; vapor pressure; and freezing and thawing environmental cycling.

Also, some embodiments of product of the invention achieve the desired features (e.g., anti-water penetration, water impermeability, strength, and/or flexibility) without requiring finish composition of substantial thickness and/or without requiring significant quantities of Class C fly ash, silane, or film-forming polymer, as described herein, due to the surprising and unexpected synergy of the ingredients in the finish composition.

Embodiments of board according to the present invention can be used in a number of interior and exterior applications, particularly where water resistance and especially waterproofness would be beneficial. For example, board in accordance with the invention can be used as backerboard, such as might be useful in the installation of ceramic tiles and natural stone in wet and dry areas of buildings or other structures. Non-limiting examples of tile backer applications would include wet areas of buildings or other structures, such as in kitchens and bathrooms, including shower stalls, backsplashes, countertops, floors, and the like.

Board according to embodiments of the invention can also be used for exterior weather barrier panels, such as for exterior sheathing. In this respect, the board can be used as an exterior sheathing panel to provide an integrated weather barrier. In other embodiments, board according to the invention can be used as a roof cover board having desirable water durability and low surface absorption properties for this application. Such low absorption may be useful to reduce usage of, for example, externally applied finishings and adhesives. In still other embodiments, board according to the invention can be used as exterior wall substrates. Such exterior wall substrates may be useful in a number of ways, such as for installation of a variety of component and finish materials, such as foam plastics, cementitious base finishes and the like, in exterior insulation finish systems (EIFS), and direct-applied exterior finish systems (DEFS), as known in the art. In one aspect, the board is useful under exterior claddings.

The following TABLE A lists typical and preferred compositions for the hydrophobic finish compositions of the present invention, and these hydrophobic finish compositions provided as a component of a cementitious article or cementitious board of the present invention. Any TABLE A "more preferred" or "most preferred" range for one or more components of the hydrophobic finish composition may be selected to modify the "preferred" composition of the present invention. However, preferably the more preferred features are used together and preferably the most preferred features are used together.

TABLE A

|  | Preferred | More Preferred | Most Preferred |
|---|---|---|---|
| Hydraulic component | 50% to about 85% by weight of the wet finish composition, wherein at least half of the hydraulic component by weight is Class C fly ash* | 55% to about 75% by weight of the wet finish composition, wherein at least half of the hydraulic component by weight is Class C fly ash* | 60% to about 70% by weight of the wet finish composition, wherein at least half of the hydraulic component by weight is Class C fly ash* |

TABLE A-continued

|  | Preferred | More Preferred | Most Preferred |
|---|---|---|---|
| Film-forming polymer (solids basis) | about 5% to about 25% by weight of the wet finish composition | about 7.5% to about 22.5% by weight of the wet finish composition | about 10% to about 20% by weight of the wet finish composition |
| Silane Compound | 5% by weight or less of the wet finish composition | 0.1-3% by weight of the wet finish composition | 0.2-1% by weight of the wet finish composition |
| Extended flow time retention agent comprising one or more carboxylic acids, one or more salts of carboxylic acids, or mixtures thereof | 0.05-1.00 wt. % by weight of hydraulic component (on a dry basis)** | 0.075-0.75 wt. % by weight of hydraulic component (on a dry basis)** | 0.10-0.50 wt. % by weight of hydraulic component (on a dry basis)** |
| One or more optional inorganic fillers and aggregates | 50% or less by weight of the wet finish composition | 45% or less by weight of the wet finish composition | 40% or less by weight of the wet finish composition |
| Optional Water reducing admixture additives | about 0% to about 5% by weight of the wet finish composition | about 0% to about 3% by weight of the wet finish composition | about 0% to about 1% by weight of the wet finish composition |
| Optional colorants | about 0% to about 2% by weight of the wet finish composition | about 0% to about 1.5% by weight of the wet finish composition | about 0% to about 1% by weight of the wet finish composition |
| Water | 5 to 30% by weight of the wet finish composition | 7.5 to 25% by weight of the wet finish composition | 10 to 20% by weight of the wet finish composition |

*The term "wet finish composition" when used in this specification means the composition including water; the term "wet basis" when used in this specification means based on the composition including water.
**The term "dry basis" when used in this specification means a water free basis.

As used in the present application percent means weight percent unless otherwise indicated.

A. Hydraulic Component

The finish composition includes hydraulic component comprising fly ash, preferably the fly ash comprises Class C fly ash, wherein the fly ash more preferably comprises Class C fly ash in an amount from about 50% to about 85% by weight of the finish composition on a water inclusive basis. In general the finish composition hydraulic component comprises Class C fly ash or an equivalent fly ash. For purposes of the present invention a Class C fly ash is defined as a fly ash containing at least 10% by weight of the fly ash and a fly ash is considered equivalent to Class C fly ash if it contains sufficiently high lime (CaO) content, wherein sufficient lime is at least about 10 wt %. Preferably the Class C fly ash or the equivalent fly ash has greater than about 20 wt %, and more preferably greater than 25 wt % of the total weight of fly ash, and most preferably about 25 to 45 wt % of the total weight of fly ash.

The hydraulic component preferably comprises, consists of, or consists essentially of the Class C fly ash. Class C type of fly ash is a high lime content fly ash that can be obtained, e.g., from processing of certain coals. For example, in some embodiments, the Class C fly ash has a lime content of at least about 10%, such as at least about 12%, at least about 15%, at least about 18% or at least about 20% by weight of the fly ash. ASTM C-618 describes the characteristics of Class C fly ash (e.g., Bayou Ash Inc., Big Cajun, II, La. or Boral Material Technologies, Scherer Plant—Juliette, Ga.). The Class C fly ash can have lime content as high as about 45%.

When mixed with water, the fly ash sets similarly to a cement or gypsum. In some embodiments, the finish composition comprises Class C fly ash and is substantially free of any other hydraulic material. As used herein, "substantially free" of such other hydraulic material means that the composition contains 0 wt. % based on the weight of the composition, or no such other hydraulic material, or an ineffective or immaterial amount of such other hydraulic material. An example of an ineffective amount is an amount below the threshold amount to achieve the intended purpose of using such setting material, as one of ordinary skill in the art will appreciate. An immaterial amount may be, e.g., about 10% or less, about 5% or less, about 2% or less, about 1% or less, about 0.5% or less, or about 0.1% or less, based on the weight of the composition, depending on the ingredient, as one of ordinary skill in the art will appreciate. As mentioned in the TABLE A above—at least half of the hydraulic component by weight is Class C fly ash.

TABLE B shows the oxide composition (XRF analysis) of the Class C fly ash used in the examples of this invention. This fly ash is from the Scherer Power Plant, Juliette, Ga. and is supplied by Boral Material Technologies, Inc.

TABLE B

| Oxide | Wt % |
|---|---|
| CaO | 27.36 |
| $SO_3$ | 2.08 |
| MgO | 5.70 |
| $Na_2O$ | 1.47 |
| $Al_2O_3$ | 18.18 |
| $Fe_2O_3$ | 5.64 |
| $SiO_2$ | 33.24 |
| $P_2O_5$ | 1.54 |
| $K_2O$ | 0.36 |
| $TiO_2$ | 1.33 |
| LOI (110-750° C.) | 0.17 |

However, in other embodiments, use of other hydraulic components in combination with fly ash are contemplated, including cements, including high alumina cements, calcium sulfates, including calcium sulfate anhydrite, calcium sulfate hemihydrates or calcium sulfate dihydrate, other hydraulic components and combinations thereof. Mixtures of fly ashes are also contemplated for use, for example, mixtures of Class C fly ash and Class F fly ash having at least 85% Class C fly ash. Silica fume (e.g., SKW Silicium Becancour, St. Laurent, Quebec, Canada) is another preferred material.

Silica fume may be used in combination with fly ash. Silica fume, also known as microsilica, (CAS number 69012-64-2, EINECS number 273-761-1) is an amorphous (non-crystalline) polymorph of silicon dioxide, silica. It is an ultrafine powder collected as a by-product of the silicon and ferrosilicon alloy production and consists of spherical particles with an average particle diameter of 150 nm. The main field of application is as pozzolanic material for high performance concrete. It is sometimes confused with fumed silica (also known as pyrogenic silica, CAS number 112945-52-5). However, the production process, particle characteristics and fields of application of fumed silica are all different from those of silica fume.

When Portland cement, quick lime (CaO) or hydrated lime (Ca(OH)2) are included in the hydraulic component, they may produce heat and impact rheology such that the finish composition may be adversely affected such as in the form of cracking or other damage. Accordingly, in some embodiments, Portland cement is included in the hydraulic component in an amount of about 50% or less by weight of the hydraulic component, such as about 45% or less, about 40% or less, about 35% or less, about 30% or less, about 25% or less, about 20% or less, about 15% or less, about 10% or less, about 5% or less, about 1% or less, or about 0.1% or less. In the case of quick lime, if included, in some embodiments, it is included in an amount of about 10% or less by weight of the hydraulic component, such as about 8% or less, about 5% or less, about 3% or less, about 1% or less, about 0.5% or less, or about 0.1% or less. With respect to hydrated lime, if included, in some embodiments, it is included in an amount of about 25% or less by weight of the hydraulic component, such as about 20% or less, about 15% or less, about 10% or less, about 5% or less, about 1% or less, about 0.5% or less, or about 0.1% or less.

Another reason Class C fly ash is desired is the increased life cycle expectancy and increase in durability associated with its use. During the hydration process, fly ash chemically reacts with the calcium hydroxide forming calcium silicate hydrates and calcium aluminate hydrates, which reduces the risk of leaching calcium hydroxide, making the composition less permeable. Class C fly ash also improves the permeability of hydraulic compositions by lowering the water-to-cement ratio, which reduces the volume of capillary pores remaining in the set composition. The spherical shape of fly ash improves the consolidation of the composition, which also reduces permeability. It is also theorized tricalcium aluminate, frequently present in fly ash, acts as a set accelerator to speed up the setting reactions. Calcium aluminate is usually found in fly ash, and it can lead to fast setting action. The present invention provides the benefit of including the extended flow control agent to facilitate industrial continuous production in spite of the presence of fast setting materials such as calcium aluminates in the hydraulic component.

In some embodiments, the fly ash has a mean particle size from about 1 micron to about 100 microns. In embodiments of the invention, the mean particle size of the fly ash can be, for example, as listed in TABLE 1 below. In the table, an "X" represents the range "from about [corresponding value in first row] to about [corresponding value in first column]." The indicated values represent mean particle size in microns. For ease of presentation, it will be understood each value represents "about" that value. For example, the first "X" is the range "from about 1 micron to about 10 microns."

TABLE 1

| | mean particle size of fly ash (microns) | | | | | | | | |
| --- | --- | --- | --- | --- | --- | --- | --- | --- | --- |
| | 1 | 10 | 20 | 30 | 40 | 50 | 60 | 70 | 80 | 90 |
| 10 | X | | | | | | | | | |
| 20 | X | X | | | | | | | | |
| 30 | X | X | X | | | | | | | |
| 40 | X | X | X | X | | | | | | |
| 50 | X | X | X | X | X | | | | | |
| 60 | X | X | X | X | X | X | | | | |
| 70 | X | X | X | X | X | X | X | | | |
| 80 | X | X | X | X | X | X | X | X | | |
| 90 | X | X | X | X | X | X | X | X | X | |
| 100 | X | X | X | X | X | X | X | X | X | X |

Thus, the mean particle size can have a range between and including any of the aforementioned endpoints.

In some embodiments, the hydraulic component is substantially free of silica ($SiO_2$), alumina ($Al_2O_3$) or iron oxide ($Fe_2O_3$). As used herein, "substantially free" of silica, alumina or iron oxide means that the composition contains 0 wt. % based on the weight of the composition, or no silica, alumina or iron oxide, or an ineffective or immaterial amount of silica, alumina or iron oxide. An example of an ineffective amount is an amount below the threshold amount to achieve the intended purpose of using such setting material, as one of ordinary skill in the art will appreciate. An immaterial amount may be, e.g., about 5% or less, about 2% or less, about 1% or less, or about 0.1% or less, based on the weight of the composition, depending on the ingredient, as one of ordinary skill in the art will appreciate.

However, if desired in some embodiments, silica, alumina, and/or iron oxide can be included. If included, in some embodiments, these materials in total account for less than about 50% by weight of the hydraulic component, such as for example, less than about 40%, less than about 30%, less than about 20%, or less than about 10% by weight of the hydraulic component.

The amount of the hydraulic component (e.g., Class C fly ash alone or in some combination with other hydraulic material) in some embodiments can be from about 50% to about 85% by weight of the wet finish composition. In embodiments of the invention, the amount of the hydraulic component can be, for example, as listed in TABLE 2 below. In the table, an "X" represents the range "from about [corresponding value in first row] to about [corresponding value in first column]." The indicated values represent percentage by weight of the wet finish composition. For ease of presentation, it will be understood each value represents "about" that value. For example, the first "X" is the range "from about 50% by weight of the wet finish composition to about 55% by weight of the composition." Wet finish composition means the total composition including water before the water evaporation (the water can come from various sources, for example a latex emulsion of polymer when added may be 50% water and 50% polymer solids).

TABLE 2

| | \multicolumn{7}{c}{(wt. %)} | | | | | | |
|---|---|---|---|---|---|---|---|
| | 50 | 55 | 60 | 65 | 70 | 75 | 80 |
| 55 | X | | | | | | |
| 60 | X | X | | | | | |
| 65 | X | X | X | | | | |
| 70 | X | X | X | X | | | |
| 75 | X | X | X | X | X | | |
| 80 | X | X | X | X | X | X | |
| 85 | X | X | X | X | X | X | X |

Thus, the amount of the hydraulic component, preferably Class C fly ash, can have a range between and including any of the aforementioned endpoints.

Preferably, the hydraulic component comprising Class C fly ash is in an amount from about 50% to about 85% by weight of the wet finish.

B. Film Forming Polymers

Film-forming polymer is included in embodiments of the finish composition. The film-forming polymer is preferably made from a pure acrylic, a rubber, a styrene butadiene rubber, a styrene acrylic, a vinyl acrylic, or an acrylated ethylene vinyl acetate copolymer. Preferably film-forming polymer is derived from at least one acrylic monomer selected from the group consisting of acrylic acid, acrylic acid esters, methacrylic acid, and methacrylic acid esters. For example, the monomers preferably employed in emulsion polymerization include methyl acrylate, methyl methacrylate, ethyl acrylate, ethyl methacrylate, butyl acrylate, butyl methacrylate, propyl acrylate, propyl methylacrylate, 2-ethyl hexyl acrylate and methacrylate, cyclohexyl acrylate and methacrylate, decyl-acrylate and methacrylate, isodecylacrylate and methacrylate, benzyl acrylate and methacrylate, other acrylates, methacrylates and their blends, acrylic acid, methacrylic acid, styrene, vinyl toluene, vinyl acetate, vinyl esters of higher carboxylic acids than acetic acid, for example, vinyl versatate, acrylonitrile, acrylamide, butadiene, ethylene, vinyl chloride and the like, and mixtures thereof.

In some embodiments, the film-forming polymer comprises one or more of the following: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and VeoVa (vinyl ester of versatic acid), copolymers of vinyl laurate and ethylene, terpolymers of vinyl acetate, ethylene and methylmethaacrylate, terpolymers of vinyl acetate, ethylene and vinyl laurate, terpolymers of vinyl acetate, ethylene and VeoVa (vinyl ester of versatic acid), and any combination thereof.

In some embodiments, the film-forming polymer is water-soluble such as, for example, a latex polymer. The polymer can be used in either liquid form or as a re-dispersible polymer. One example is a copolymer of methyl methacrylate and butyl acrylate (e.g., FORTON VF 774, EPS Inc., Marengo, Ill.).

Preferably, the film-forming polymer comprises one or more of the following: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and VeoVa vinyl ester of versatic acid (commercially available under the mark VeoVa from Shell Chemical Company), copolymers of vinyl laurate and ethylene, terpolymers of vinyl acetate, ethylene and methyl methacrylate, terpolymers of vinyl acetate, ethylene and vinyl laurate, terpolymers of vinyl acetate, ethylene, and vinyl esters of branched tertiary monocarboxylic acids (e.g. vinyl ester of versatic acid commercially available under the mark VeoVa from Shell Chemical Company or sold as EXXAR neo vinyl esters by ExxonMobil Chemical Company), itaconic acid, crotonic acid, maleic acid, fumaric acid, and ethylene, and any combination thereof.

As used herein, "molecular weight" in reference to a polymer or any portion thereof, means to the weight-average molecular weight ("$M_w$") of the polymer or portion. In one embodiment, the polymers for use in the present invention exhibit a weight average molecular weight of greater than or equal to 10,000 grams per mole ("g/mole"). For example, in a range of 30,000 to 5,000,000 g/mole. More typically the polymer of the present invention exhibits a weight average molecular weight of from about 100,000 g/mole to about 2,500,000 g/mole, or more typically about 150,000 g/mole to about 1,000,000 g/mole.

Commonly used monomers are butyl acrylate, methyl methacrylate, ethyl acrylate and the like. Preferably, the monomers include one or more monomers selected from the group consisting of n-butyl acrylate, methyl methacrylate, styrene, and 2-ethylhexyl acrylate.

The at least one polymer is preferably derived from at least one acrylic monomer selected from the group consisting of acrylic acid, acrylic acid esters, methacrylic acid, and methacrylic acid esters. For example, the at least one film-forming polymer can be a butyl acrylate/methyl methacrylate copolymer or a 2-ethylhexyl acrylate/methyl methacrylate copolymer. For example, the at least one polymer can be a butyl acrylate/methyl methacrylate copolymer or a 2-ethylhexyl acrylate/methyl methacrylate copolymer. Typically, the at least one polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes such as 1,3-butadiene, isoprene or chloroprene.

For example, the at least one film-forming polymer can be a pure acrylic, a styrene acrylic, a vinyl acrylic or an acrylated ethylene vinyl acetate copolymer.

The pure acrylics preferably comprise acrylic acid, methacrylic acid, an acrylate ester, and/or a methacrylate ester as the main monomers). The styrene acrylics preferably comprise styrene and acrylic acid, methacrylic acid, an acrylate ester, and/or a methacrylate ester as the main monomers. The vinyl acrylics preferably comprise vinyl acetate and acrylic acid, methacrylic acid, an acrylate ester, and/or a methacrylate ester as the main monomers. The acrylated ethylene vinyl acetate copolymers preferably comprise ethylene, vinyl acetate and acrylic acid, methacrylic acid, an acrylate ester, and/or a methacrylate ester as the main monomers. The monomers can also include other main monomers such as acrylamide and acrylonitrile, and one or more functional monomers such as itaconic acid and ureido methacrylate, as would be readily understood by those skilled in the art. In a particularly preferred embodiment, the film-forming polymer is a pure acrylic such as a butyl acrylate/methyl methacrylate copolymer derived from monomers including butyl acrylate and methyl methacrylate.

A typical film-forming polymer is comprised of one or more esters of acrylic or methacrylic acid, typically a mixture, e.g. about 50/50 by weight, of a high $T_g$ monomer (e.g. methyl methacrylate) and a low $T_g$ monomer (e.g. butyl acrylate), with small proportions, e.g. about 0.5% to about 2% by weight, of acrylic or methacrylic acid. The vinyl-acrylic polymers for example include vinyl acetate and butyl acrylate and/or 2-ethyl hexyl acrylate and/or vinyl versatate. In a typical vinyl-acrylic polymer, at least 50% of the polymer formed is comprised of vinyl acetate, with the remainder being selected from the esters of acrylic or methacrylic acid. The styrene/acrylic polymers are typically similar to the acrylic polymers, with styrene substituted for all or a portion of the methacrylate monomer thereof.

The film-forming polymer can be present in some embodiments in an amount from about 5% to about 25% by weight of the wet finish composition. In embodiments of the invention, the amount of the film-forming polymer can be, e.g., as listed in TABLE 3 below. In the table, an "X" represents the range "from about [corresponding value in first row] to about [corresponding value in first column]." The indicated values represent percentage by weight of the wet finish composition. For ease of presentation, it will be understood that each value represents "about" that value. For example, the first "X" is the range "from about 5% by weight of the wet finish composition to about 8% by weight of the wet finish composition."

TABLE 3

| | \multicolumn{8}{c}{(wt. %)} | | | | | | | |
|---|---|---|---|---|---|---|---|---|
| | 5 | 8 | 10 | 12 | 15 | 18 | 20 | 22 |
| 8 | X | | | | | | | |
| 10 | X | X | | | | | | |
| 12 | X | X | X | | | | | |
| 15 | X | X | X | X | | | | |
| 18 | X | X | X | X | X | | | |
| 20 | X | X | X | X | X | X | | |
| 22 | X | X | X | X | X | X | X | |
| 25 | X | X | X | X | X | X | X | X |

Thus, the amount of the film-forming polymer can have a range between and including any of the aforementioned endpoints.

C. Silane Compound

Silane compound is included in the finish composition in accordance with the present invention. In some embodiments, the silane is within the general chemical formula (I):

$$(R^1O)_m\text{—Si—}X_{4-m} \qquad (I)$$

where $R^1O$ is an alkoxy group, X is an organofunctional group, and m ranges from 1 to 3. With respect to the RO alkoxy group, in some embodiments, typically RO is a C1-C8 alkoxy, for example R can be methoxy or ethoxy, although other alkoxy groups are contemplated and can be included. The X organofunctional group can be any such hydrophobicity providing group, such as C1-C12 alkyl, for example, methyl, ethyl, propyl, butyl, pentyl, hexyl or octyl. Long-chain organofunctional groups such as butyl, pentyl, hexyl and octyl groups are preferably selected in some embodiments of the invention for their beneficial role in providing enhanced hydrophobicity. Typically, the silane compound (e.g., alkyl alkoxysilane) has a molecular weight of at least about 150 Daltons.

Preferably, the silane compound is one or more of octyltriethoxy silane, isooctyltriethoxy silane, octyltrimethoxy silane, isooctyltrimethoxy silane, butyltriethoxy silane, isobutyltriethoxy silane, butyltrimethoxy silane, or isobutyltrimethoxy silane.

While not being bound by any theory, it is believed silane compounds with long-chain organofunctional groups X, for example butyl, pentyl, hexyl and octyl groups, are relatively more stable in the finish composition of embodiments of the present invention and therefore provide superior water repellency characteristics. Silanes crosslink or bond to inorganic surfaces through elimination of the alkoxy groups after hydrolysis and condensation reaction. The alkoxy groups react with themselves and any hydroxy (OH) groups within the substrate when moisture is present, forming a silicone resin network. This formation of strong chemical bonds provides long term durability such as might be characteristics of silicone treatments. However, in some embodiments, although generally less preferred, and excluded in some embodiments, it may be possible to utilize small-chain organofunctional groups such as methyl although their use may lead to less desirable hydrophobicity and anti-water penetration properties.

In some embodiments, silane compound (e.g., alkyl alkoxysilane) according to the invention is characterized by a molecular weight of at least about 150, preferably at least about 175, at least about 200, at least about 225, or greater. The silane compound can be added to the mixture either in a concentrated form or in the form of an emulsion, as one of ordinary skill in the art will readily appreciate.

Some examples of suitable alkyl alkoxysilane compounds in accordance with embodiments of the invention include, for example, octyltriethoxy silane, isooctyltriethoxy silane, octyltrimethoxy silane, isooctyltrimethoxy silane, butyltriethoxy silane, isobutyltriethoxy silane, butyltrimethoxy silane, or isobutyltrimethoxy silane, or any combination thereof. In some embodiments, mixtures of silanes and siloxane compounds can be utilized to provide the desired degree of water penetration resistance to the panels of the invention.

Silane compound can be present in accordance with embodiments of the invention in an amount of about 5% by weight or less of the wet finish composition (total composition including its water). Preferably, the silane compound is in an amount from about 0.1% to about 5% by weight of the wet finish composition.

In embodiments of the invention, the amount of the silane compound can be, e.g., as listed in TABLE 4 below. In the table, an "X" represents the range "from about [corresponding value in first row] to about [corresponding value in first column]." The indicated values represent percentage by weight of the wet finish composition. For ease of presentation, it will be understood each value represents "about" that value. For example, the first "X" is the range "from about 0.1% by weight of the wet finish composition to about 0.5% by weight of the wet finish composition."

TABLE 4

| | 0.1 | 0.5 | 1 | 1.5 | 2 | 2.5 | 3 | 3.5 | 4 | 4.5 |
|---|---|---|---|---|---|---|---|---|---|---|
| 0.5 | X | | | | | | | | | |
| 1 | X | X | | | | | | | | |
| 1.5 | X | X | X | | | | | | | |
| 2 | X | X | X | X | | | | | | |
| 2.5 | X | X | X | X | X | | | | | |
| 3 | X | X | X | X | X | X | | | | |
| 3.5 | X | X | X | X | X | X | X | | | |
| 4 | X | X | X | X | X | X | X | X | | |
| 4.5 | X | X | X | X | X | X | X | X | X | |
| 5 | X | X | X | X | X | X | X | X | X | |

Thus, the amount of silane compound can have a range between and including any of the aforementioned endpoints.

D. Extended Flow Time Retention Agent

The hydrophobic finish composition of the invention (also known as a coating composition) comprises an extended flow time retention agent comprising, consisting, or consisting essentially of at least one member of the group consisting of carboxylic acids, salts of carboxylic acids, or mixtures thereof. Preferably the salts are alkali (for example sodium or potassium), alkaline (for example calcium), or ammonium salts, most preferably the salts are sodium or potassium salts. The hydrophobic finish (coating) compositions of the invention comprising an extended flow time retention agent stay fluid and workable for at least 30 minutes or longer, preferably at least 60 minutes or longer, more preferably at least 120 minutes or longer, and most preferably at least 240 minutes or longer without stiffening.

Typically carboxylic acid has the chemical formula (II):

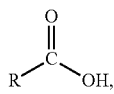

(II)

wherein R is an organofunctional group, the organic moiety may be substituted or unsubstituted, for example it may be substituted with one or more additional carboxyl functional groups (—COOH);

wherein the salts of carboxylic acid have the chemical formula (III)

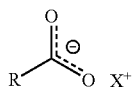

wherein R is as defined in formula (II) and $X^+$ is a cation, for example sodium or potassium.

The term organofunctional group in the present specification means a substituted or unsubstituted organic moiety.

Various carboxylic acid families particularly useful as extended flow time retention agent in the compositions of this invention include tricarboxylic acids such as citric acid and isocitric acid; dicarboxylic acids such as malic acid, succinic acid and aldaric acids; sugar acids such as aldonic acids, uronic acids and aldaric acids; aromatic carboxylic acids such as benzoic acid and salicylic acid; amino carboxylic acids such as ethylene diamine tetra acetic acid (EDTA), ethylene glycol tetra acetic acid (EGTA), diethylene triamine penta acetic acid (DTPA) and ethylene diamine disuccinic acid (EDDS); alpha hydroxy acids such as tartaric acid; beta hydroxy acids such as salicylic acid. Typical aldonic acids are gluconic acid, glyceric acid, and xylonic acid. Typical aldaric acids are tartaric acid, mucic acid, and saccharic acid. Typical uronic acids are glucuronic acid, galacturonic acid. These carboxylic acid families, and alkali, alkaline, and ammonium salts thereof, most preferably sodium salts thereof and potassium salts thereof, are particularly useful in the present invention.

A tricarboxylic acid is an organic carboxylic acid whose chemical structure contains three carboxyl functional groups (—COOH). The general molecular formula for dicarboxylic acids can be written as $R—(CO_2H)_3$, where R can be aliphatic or aromatic, preferably C3-C6 aliphatic, most preferably C3 aliphatic.

A dicarboxylic acid is an organic carboxylic acid whose chemical structure contains two carboxyl functional groups (—COOH). The general molecular formula for dicarboxylic acids can be written as $HO_2C—R—CO_2H$, where R can be a bond, aliphatic, or aromatic, preferably C1-C15 aliphatic.

Sugar acids are monosaccharides with a carboxyl functional groups (—COOH). Preferred classes of sugar acids include Aldonic acids, Uronic acids, or Aldaric acids.

Aldonic acids are any of a family of sugar acids obtained by oxidation of the aldehyde functional group of an aldose to form a carboxylic acid functional group. Typical aldonic acids are glyceric acid, xylonic acid, gluconic acid, and ascorbic acid. Structural formula (IIa) shows the chemical structure of D-gluconic acid, an aldonic acid derived from glucose:

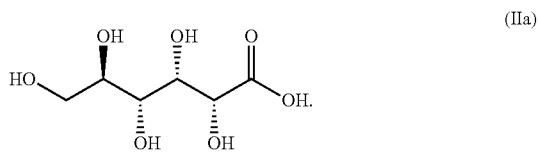 [SMILES: O=C(O)[C@H](O)[C@@H](O)[C@H](O)[C@H](O)CO]

(IIa)

Uronic acids are any of a family of sugar acids in which the terminal hydroxyl group of an aldose or ketose is oxidized. The Uronic acids have both carbonyl and carboxylic acid functional groups. They are sugars in which the terminal carbon's hydroxyl group has been oxidized to a carboxylic acid. Typical Uronic acids are Glucuronic acid, Galactouronic acid, and Iduronic acid. Structural formula (IIb) shows the chemical structure of beta-D glucuronic acid:

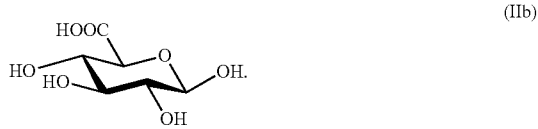

(IIb)

Aldaric acids are any of a family of sugar acids in which both ends of an aldose are oxidized. An aldaric acid is an aldose in which both the hydroxyl function of the terminal carbon and the aldehyde function of the first carbon have been fully oxidized to carboxylic acid functions. (Oxidation of just the aldehyde yields an aldonic acid while oxidation of just the terminal hydroxyl group yields an uronic acid.) Typical Aldaric acids are Tartaric acid, meso-Galactaric acid, and D-Glucaric acid. Structural formula (IIc) shows the chemical formula of glucaric acid, also known as saccharic acid:

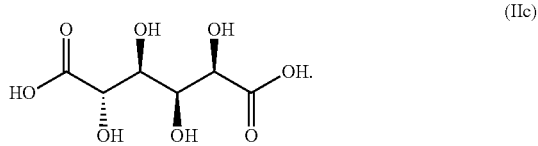 [SMILES: O=C(O)[C@@H](O)[C@@H](O)[C@H](O)[C@@H](O)C(=O)O]

(IIc)

Aromatic carboxylic acids include compounds that contain a carboxyl functional groups (—COOH) bonded to an aromatic ring.

Amino carboxylic acids have both the amine and the carboxylic acid groups. Typical amino carboxylic acids have both the amine and the carboxylic acid groups attached to the first (alpha-) carbon atom. They are known as 2-, alpha-, or α-amino acids (generic formula $H_2NCHRCOOH$, wherein R is a substituted or unsubstituted organic moiety). Amino carboxylic acids can have multiple amino and/or multiple carboxylic acid groups.

α-Hydroxy acids, or alpha hydroxy acids (AHAs), are a class of chemical compounds that contains a carboxylic acid substituted with a hydroxyl group on the adjacent carbon. Tartaric acid and citric acid are examples of alpha hydroxy acid. Glyceric acid, glycolic acid, and lactic acid are also examples of alpha hydroxy acids. An alpha hydroxy acid contains a carboxylic acid functional group and hydroxy functional group separated by one carbon atom. In contrast, a beta hydroxy acid or β-hydroxy acid (BHA) is an organic compound that contains a carboxylic acid functional group and hydroxy functional group separated by two carbon atoms. Salicyclic acid is an example of beta hydroxy acid.

Preferably the extended flow time retention agents of the present invention are carboxylic acids selected from at least member of the group consisting of dicarboxylic acids, tricarboxylic acids, alpha hydroxy acids, and sugar acids, and alkali, alkaline, or ammonium salts thereof. Preferably the carboxylic acid salts of the present invention are sodium or potassium salts.

Preferably for the finish compositions, articles, and mat faced cementitious boards of the present invention the extended flow time retention agent comprises at least one member of the group consisting of tartaric acid, gluconic acid, citric acid, sodium gluconate, potassium gluconate, potassium tartrate, sodium tartrate, potassium sodium tartrate, sodium citrate, and potassium citrate. Preferred forms of potassium tartrate useful in this invention are also variously known as L(+)-potassium L-tartrate monobasic, tartaric acid monopotassium salt, potassium hydrogen L-tartrate, potassium hydrogen tartrate.

Examples of particularly preferred carboxylic acid based flow time retention agents of this invention include citric acid, tartaric acid, and gluconic acid. Examples of more preferred flow time retention agents of this invention include gluconic acid and tartaric acid. Tartaric acid is one of the most preferred flow time retention agents of this invention. Different forms of tartaric acids can be employed in the present invention including levotartaric acid, dextrotartaric acid, racemic acid and mesotartaric acid.

Examples of preferred flow time retention agents that are salts of carboxylic acids include sodium citrate, potassium citrate, sodium gluconate, potassium gluconate, potassium tartrate, sodium tartrate, potassium sodium tartrate. Sodium gluconate, potassium gluconate, potassium tartrate, sodium tartrate, potassium sodium tartrate represent some of the more preferred flow time retention agents of this invention. Potassium tartrate is one of the most preferred flow time retention agents of this invention; however, as described previously, tartaric acid is more preferred than potassium tartrate in the present invention.

According to this invention, the flow time retention agents based on carboxylic acids are superior to their counterparts based on salts of the same carboxylic acid, particularly sodium and potassium salts. For instance, according to this invention, tartaric acid has been found to be superior to potassium tartrate or sodium tartrate; alternatively, gluconic acid has been found to be superior to sodium gluconate or potassium gluconate. Surprisingly it has also been discovered that the coating compositions of this invention comprising carboxylic acid based flow time retention agents provide significantly reduced surface water absorption than the corresponding compositions comprising salts of the same carboxylic acid. This is an important discovery since a main use of the cementitious coatings of the present invention is for waterproofing applications.

The compositions of the present invention may comprise carboxylic acid flow retention agents separately from the salts of carboxylic acid flow retention agent as shown, for example, in a number of the examples of the present specification. In the alternative, the compositions of the present invention may comprise carboxylic acid extended flow retention agents together with the salts of carboxylic acid extended flow retention agent as shown, for example, in a number of other examples of the present specification.

Thus, the cementitious compositions of the invention can also utilize mixtures of carboxylic acids and salts of carboxylic acids as flow time retention agent. For instance, tartaric acid may be used in combination with potassium tartrate; or, tartaric acid may be used in combination with sodium gluconate; or gluconic acid may be used in combination with potassium tartrate; etc.

The carboxylic acid and/or carboxylate salt based flow time retention agent can be present in accordance with embodiments of the invention in an amount from about 0.05% to about 1.00% by weight based upon weight of the hydraulic component on a water free (dry) basis. Thus, for example if there are 100 grams of hydraulic component solids with no water and the carboxylic acid is 0.5% by weight based upon weight of the hydraulic component, then there are 0.5 grams of carboxylic acid and the total weight of the hydraulic component solids and the flow time retention agent is 100.5 grams. Likewise for example, if there are 100 grams of hydraulic component and the carboxylic acid is 0.50 wt % and the salt of carboxylic acid is 0.25 wt %, respectively, by weight based upon weight of the hydraulic component, then there are 0.50 grams of carboxylic acid and 0.25 grams of salt of carboxylic acid in the composition and the total weight of the hydraulic component solids and the flow time retention agent is 100.75 grams.

In embodiments of the invention, the amount of the carboxylic acid and/or carboxylate salt can be, e.g., as listed in TABLE 5 below. In TABLE 5, an "X" represents the range "from about [corresponding value in first row] to about [corresponding value in first column]." The indicated values represent percentage by weight of the hydraulic component. For ease of presentation, it will be understood each value represents "about" that value. For example, the first "X" is the range "from about 0.05% by weight to about 1.00% by weight of the hydraulic component." A more preferred dosage of carboxylic acid and/or carboxylate salt based flow time retention agent dosage is about 0.1% by weight to about 0.75% by weight of the hydraulic component. The most preferred dosage of carboxylic acid and/or carboxylate salt based flow time retention agent is about 0.15% by weight to about 0.50% by weight of the hydraulic component.

TABLE 5

|      | 0.1 | 0.1 | 0.2 | 0.5 | 0.8 | 1 |
|------|-----|-----|-----|-----|-----|---|
| 0.05 | X   |     |     |     |     |   |
| 0.1  | X   | X   |     |     |     |   |
| 0.2  | X   | X   | X   |     |     |   |
| 0.5  | X   | X   | X   | X   |     |   |
| 0.8  | X   | X   | X   | X   | X   |   |
| 1    | X   | X   | X   | X   | X   | X |

Thus, the total amount of carboxylic acid and/or salt can have a range between and including any of the aforementioned endpoints.

The extended flow time retention agents of the present invention are particularly beneficial when operational conditions and parameters of a given manufacturing process provide wet cementitious slurry mixtures having high temperatures of up to 150° F. In absence of the extended flow time retention agents of the present invention, the high temperature of the wet cementitious slurry mixtures is responsible for rapid material gelation and premature loss in material flow and processing properties. The addition of extended flow time retention agents of the present invention to the cementitious compositions of the invention allows the high temperature slurries to retain their flow and processing properties for an extended duration thus making the manufacturing processes commercially viable.

Advantageously, during manufacture of the cementitious articles of the present invention, the coating composition stays fluid and workable for at least 30 minutes or longer, preferably at least 60 minutes or longer, more preferably at least 120 minutes or longer, and most preferably at least 240 minutes or longer without stiffening.

The hydrophobic finish composition of this invention stays fluid and workable at a particular hydrophobic finish slurry temperature for a time of at least 30 minutes, preferably at least 60 minutes, more preferably at least 120 minutes, and most preferably at least 240 minutes. The particular hydrophobic finish slurry temperature being at least one of the following listed slurry temperatures: about 70° F., preferably about 90° F., more preferably about 110° F., still more preferably about 130° F., and most preferably about 150° F.

A typical family of carboxylic acids for the present invention includes those wherein R In above-listed chemical formula (II) is a C1-C20 alkyl or C1-C12 alkyl. However, preferably the carboxylic acids and/or salts of carboxylic acids used as extended flow time retention agents in the present invention are other than saturated carboxylic acids of formula RCOOM wherein R is H or C1 to C20 alkyl or C1-C12 alkyl, and M is H, and salts thereof. The saturated carboxylic acids of formula RCOOM and/or salts thereof are optional, and typically not included in compositions of the present invention.

The present carboxylic acids and/or salts of carboxylic acids differ from polycarboxylates, sulfonated melamines, and sulfonated naphthalenes disclosed as superplasticizers in US 20140272402 to Dubey et al, CEMENTITIOUS ARTICLE COMPRISING HYDROPHOBIC FINISH. For example, they differ from superplasticizers such as ADVA CAST and ADVA CAST 500 polycarboxylate ether superplasticizers by Grace Construction Products, Cambridge, Mass., SIKA VISCOCRETE G2 polycarboxylate ether superplasticizer from SIKA Corporation, Lyndhurst, N.J., ETHACRYL M and ETHACRYL G polycarboxylate ether superplasticzer from available from Coatex-Arkema, Genay, France, MELFLUX PCE239, MELFLUX PCE 541 polycarboxlate ether superlasticizer from BASF, Trostberg, Germany, and DILOFLO GW Superplasticizer of Geo Specialty Chemicals, Cedartown, Ga. which is a sodium salt of sulfonated naphthalenesulfonate. It is noteworthy that the inventors found polycarboxylate ether superplasticizers that are extremely effective as flow control and water reducing admixtures in conventional cement-based materials and concrete were of little benefit or even disruptive to the flow behavior of compositions of this invention. This finding is unexpected and surprising since polycarboxylate ether based superplasticizers are known in the art for producing cementitious mixtures possessing extremely good flow behavior. Surprisingly, addition of polycarboxylate ether superplasticizers in the compositions of the invention was found to increase the slurry viscosity and (Sheen Cup) flow time substantially.

The carboxylic acids and/or salts of carboxylic acids used as extended flow time retention agents of the present invention are other than copolymerizable unsaturated carboxylic acids and/or salts of copolymerizable unsaturated carboxylic acids. For example they are other than acrylic acids and/or methacrylic acids or salts thereof.

The carboxylic acids and/or salts of carboxylic acids used as extended flow time retention agents of the present invention are preferably other than copolymerizable unsaturated carboxylic acids and/or salts of copolymerizable unsaturated carboxylic acids such as those of structural formula (IV):

monocarboxylic acid monomers according to structure (IV):

wherein:
$R^3$ is a moiety having a site of ethylenic unsaturation.
$R^4$ is absent or is a bivalent linking group, and
$R^5$ is a moiety that comprises at least one carboxylic acid group (also known as a carboxyl group (C(O)OH)), More particularly, the carboxylic acids and/or salts of carboxylic acids used as extended flow time retention agents of the present invention are preferably other than copolymerizable unsaturated carboxylic acids and/or salts of copolymerizable unsaturated carboxylic acids such as those of structural formula (V):

wherein $R^6$, $R^7$, $R^8$ are H or substituted or unsubstituted functional groups, and $R^9$ is a functional group containing a carboxyl group (C(O)OH), or polymerized versions thereof, or salts thereof. Thus, for example, carboxylic acids and/or salts of carboxylic acids used as extended flow time retention agents of the present invention are other than methacrylic acid of structural formula (VI):

E. Optional Finish Composition Ingredients

One or more inorganic fillers and aggregates can optionally be included in the hydrophobic finish composition of some embodiments, e.g., to reduce cost and decrease shrinkage cracking. Typical fillers include sand, talc, mica, calcium carbonate, calcined clays, pumice, crushed or expanded perlite, volcanic ash, rice husk ash, diatomaceous earth, slag, metakaolin, and other pozzolanic materials. Amounts of these materials should not exceed the point where properties such as strength are adversely affected. For example, in some embodiments, the cumulative amount of aggregate or inorganic filler is about 50% or less by weight of the wet (composition including water) finish composition, such as, for example, about 45% or less, about 30% or less, about 20% or less, about 10% or less, about 5% or less, about 2% or less, about 1% or less, or about 0.1% or less.

In some embodiments, such as when very thin finishes are being prepared, the use of very small fillers, such as sand or microspheres are preferred. If included, in some embodiments, the filler and/or aggregate preferably has a particle size of about 3000 microns or less, about 2500 microns or less, about 2000 microns or less, about 1500 microns or less, about 1000 microns or less, about 500 microns or less, or about 100 microns or less. While not wishing to be bound by any particular theory, it is believed larger particle sizes can sometimes interfere with the process for finishing such that uniform coverage may be less apt to be achieved at times.

Water reducing admixture additives optionally can be included in embodiments of the finish composition, such as, for example, superplasticizer, to improve the fluidity of a hydraulic slurry. Such additives disperse the molecules in solution so that they move more easily relative to each other, thereby improving the flowability of the entire slurry. Polycarboxylates, sulfonated melamines and sulfonated naphthalenes are known as superplasticizers. Preferred superplasticizers include ADVA CAST and ADVA CAST 500 by Grace Construction Products, Cambridge, Mass. and DILOFLO GW Superplasticizer of Geo Specialty Chemicals, Cedartown, Ga. The addition of these materials allows the user to tailor the fluidity of the slurry to the particular application.

Water reducing admixture additive can be present in an amount from about 0% to about 5% by weight of the wet finish composition. In embodiments of the invention, the water reducing admixture additive can be, e.g., as listed in TABLE 6 below. In the table, an "X" represents the range "from about [corresponding value in first row] to about [corresponding value in first column]." The indicated values represent percentage by weight of the wet finish composition. For ease of presentation, it will be understood each value represents "about" that value. For example, the first "X" is the range "from about 0% to about 0.5% by weight of the wet finish composition."

TABLE 6

|     | 0.1 | 0.5 | 1 | 1.5 | 2 | 2.5 | 3 | 3.5 | 4 | 4.5 |
|-----|-----|-----|---|-----|---|-----|---|-----|---|-----|
| 0.5 | X   |     |   |     |   |     |   |     |   |     |
| 1   | X   | X   |   |     |   |     |   |     |   |     |
| 1.5 | X   | X   | X |     |   |     |   |     |   |     |
| 2   | X   | X   | X | X   |   |     |   |     |   |     |
| 2.5 | X   | X   | X | X   | X |     |   |     |   |     |
| 3   | X   | X   | X | X   | X | X   |   |     |   |     |
| 3.5 | X   | X   | X | X   | X | X   | X |     |   |     |
| 4   | X   | X   | X | X   | X | X   | X | X   |   |     |
| 4.5 | X   | X   | X | X   | X | X   | X | X   | X |     |
| 5   | X   | X   | X | X   | X | X   | X | X   | X |     |

Colorants optionally can be added to the finish composition to change the color of the composition or finished articles as desired. Fly ash is typically gray in color, with the Class C fly ash usually lighter than Class F fly ash. Any dyes or pigments that are compatible with the composition may be optionally used. Titanium dioxide is optionally used as a whitener. A preferred colorant is Ajack Black from Solution Dispersions, Cynthiana, Ky. Colorant can be present in an amount from about 0% to about 2% by weight of the wet finish composition, such as, for example, in an amount from about 0.1% to about 2% by weight of the wet finish composition, from about 0.5% to about 2% by weight of the wet finish composition, from about 1% to about 2% by weight of the wet finish composition, from about 0.1% to about 1.5% by weight of the wet finish composition, or about 0.5% to about 1.5% by weight of the wet finish composition.

F. Fibrous Mat

The fibrous mat comprises any suitable type of polymer or mineral fiber, or combination thereof. Non-limiting examples of suitable fibers include glass fibers, polyamide fibers, polyaramide fibers, polypropylene fibers, polyester fibers (e.g., polyethylene teraphthalate (PET)), polyvinyl alcohol (PVOH), polyvinyl acetate (PVAc), cellulosic fibers (e.g., cotton, rayon, etc.), and the like, as well as combinations thereof. Furthermore, the fibers of the mat can be hydrophobic or hydrophilic, finished or unfinished. Of course, the choice of fibers will depend, in part, on the type of application in which the cementitious article is to be used. For example, when the cementitious article is used for applications that require heat or fire resistance, appropriate heat or fire resistant fibers should be used in the fibrous mat.

The fibrous mat can be woven or non-woven; however, non-woven mats are preferred. Non-woven mats comprise fibers bound together by a binder. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and the like, as well as combinations thereof. Suitable fibrous mats include commercially available mats used as facing materials for cementitious articles.

By way of further illustration, a non-limiting example of a suitable glass fiber mat comprises about 80-90 percent (e.g., about 83 percent) 16 micron diameter, ½-inch to 1-inch long (about 1.2-2.5 cm long) continuous filament fibers and about 10-20 percent (e.g., about 17 percent) biosoluble microfibers having about 2.7 nominal micron diameter (Micro-Strand® Type 481, manufactured by Johns Manville) with a basis weight of about 24 lbs/1000 ft$^2$. One suitable glass fiber mat is the DuraGlass® 8924G Mat, manufactured by Johns Manville. The binder for the glass mat can be any suitable binder, for example, styrene acrylic binder, which can be about 28% (+/−3%) by weight of the mat. The glass mat can include a colored pigment, for example, green pigment or colorant.

The finish material can be applied to the fibrous mat as a liquid or solid material (e.g., resin, wet-dispersed powder, dry powder, or film) by any of various methods known in the art. For instance, the hydrophobic finish materials can be applied by brushing, spraying, rolling, pouring, dipping, sifting, or overlaying the hydrophobic finish material. Solid materials, such as powders, can be dispersed prior to application using any common solvent (e.g., water, alcohols, etc.) or dispersant, provided the solvent or dispersant does not react adversely with the fibrous mat materials. Solvents that etch the surface fibers of the fibrous mat, and thereby enhance the ability of the finish material to adhere to the mat, also can be used. Preferably, any solvent or dispersant used is easily dried and does not leave a residue that prevents the finish from adhering to the fibrous mat. Liquid or dispersed finish materials can have any viscosity suitable for application to the fibrous mat. Typically, the viscosity of a liquid or dispersed finish material will be from about 50-200 Kreb's units (KU) (about 300-20,000 cP), such as about 80-150 KU (about 800-8,000 cP).

Recognizing that the surface of the fibrous mat is an irregular surface, the finish material need not provide a finish that is completely continuous. When a liquid or powder finish composition is used, for instance, the finish material may fall within the voids between the fibers of the mat leaving gaps or holes in the finish. However, the finish material preferably is applied in an amount sufficient to provide a finish that is continuous and, desirably, coextensive with the dimensions of the first fibrous mat.

G. Product Structure

The hydrophobic finish applied to the first fibrous mat is preferably in the form of a layer. The layer, desirably, is thick enough to slow or prevent the penetration of cementitious slurry through the fibrous mat during production.

The finish desirably has a degree of hydrophobicity such that water applied to the finish surface exhibits a contact angle of about 30° or greater (e.g., about 40° or greater), such as about 30° to about 120°, or about 50° to about 100° The contact angle can be measured by any suitable technique.

The mat and finish together can form a composite of desired density and thickness. Advantageously, the finish in accordance with embodiments of the invention provides the aforesaid water resistance and aforesaid mechanical properties while using low amounts of finish and small thickness of finish, due to the surprising synergistic effect of the ingredients in the finish. For example, in some embodiments, the thickness of the finished fiber mat composite can be from about 0.0075 inches to about 0.040 inches, such as from about 0.0100 to about 0.030 inches, or from about 0.0125 to about 0.020 inches. In embodiments of the invention, the thickness of the finished fiber mat composite can be, e.g., as listed in TABLE 7A and TABLE 7B below. In the tables, an "X" represents the range "from about [corresponding value in first row] to about [corresponding value in first column]." The indicated values represent thickness of the finished fiber mat composite in inches. For ease of presentation, it will be understood that each value represents "about" that value. For example, the first "X" in TABLE 7A is the range "0.0075 inches to about 0.0100 inches."

TABLE 7A

|  | 0.0075 | 0.1 | 0.0125 | 0.015 | 0.0175 | 0.02 |
|---|---|---|---|---|---|---|
| 0.01 | X | | | | | |
| 0.0125 | X | X | | | | |
| 0.015 | X | X | X | | | |
| 0.0175 | X | X | X | X | | |
| 0.02 | X | X | X | X | X | |
| 0.0225 | X | X | X | X | X | X |
| 0.025 | X | X | X | X | X | X |
| 0.0275 | X | X | X | X | X | X |
| 0.03 | X | X | X | X | X | X |

TABLE 7A-continued

|  | 0.0075 | 0.1 | 0.0125 | 0.015 | 0.0175 | 0.02 |
|---|---|---|---|---|---|---|
| 0.325 | X | X | X | X | X | X |
| 0.035 | X | X | X | X | X | X |
| 0.0375 | X | X | X | X | X | X |
| 0.04 | X | X | X | X | X | X |

TABLE 7B

|  | 0.0225 | 0.025 | 0.0275 | 0.03 | 0.0325 | 0.035 | 0.0375 |
|---|---|---|---|---|---|---|---|
| 0.025 | X | | | | | | |
| 0.0275 | X | X | | | | | |
| 0.03 | X | X | X | | | | |
| 0.0325 | X | X | X | X | | | |
| 0.0375 | X | X | X | X | X | | |
| 0.04 | X | X | X | X | X | X | X |

Thus, the thickness of the finished fiber mat composite can have a range between and including any of the aforementioned endpoints set forth in TABLE 7A or TABLE 7B.

With respect to density of the finished fiber mat composite, in some embodiments, the finish composition can be from about 65 pcf (pounds per cubic foot) to about 125 pcf such as from about 75 pcf to about 115 pcf, or from about 80 pcf to about 120 pcf. In embodiments of the invention, the density of the finished fiber mat composite can be, e.g., as listed in TABLE 8 below. In the table, an "X" represents the range "from about [corresponding value in first row] to about [corresponding value in first column]." The indicated values represent density of the finished mat composite in lb/MSF. For ease of presentation, it will be understood that each value represents "about" that value. For example, the first "X" is the range "65 pcf to about 70 pcf."

TABLE 8

|  | 65 | 70 | 75 | 80 | 85 | 90 | 95 | 100 | 105 | 110 | 115 | 120 |
|---|---|---|---|---|---|---|---|---|---|---|---|---|
| 70 | X | | | | | | | | | | | |
| 75 | X | X | | | | | | | | | | |
| 80 | X | X | X | | | | | | | | | |
| 85 | X | X | X | X | | | | | | | | |
| 90 | X | X | X | X | X | | | | | | | |
| 95 | X | X | X | X | X | X | | | | | | |
| 100 | X | X | X | X | X | X | X | | | | | |
| 105 | X | X | X | X | X | X | X | X | | | | |
| 110 | X | X | X | X | X | X | X | X | X | | | |
| 115 | X | X | X | X | X | X | X | X | X | X | | |
| 120 | X | X | X | X | X | X | X | X | X | X | X | |
| 125 | X | X | X | X | X | X | X | X | X | X | X | X |

Thus, the density of the finished fiber mat composite can have a range between and any of the aforementioned endpoints.

In some embodiments, the finish composition weight can be from about 40 lb/MSF (pounds per thousand square feet) to about 200 lb/MSF, such as from about 60 lb/MSF to about 160 lb/MSF, or from about 80 lb/MSF to about 120 lb/MSF. In embodiments of the invention, the finish weight can be, e.g., as listed in TABLE 9 below. In the table, an "X" represents the range "from about [corresponding value in first row] to about [corresponding value in first column]." The indicated values represent finish weight in lb/MSF. For ease of presentation, it will be understood that each value represents "about" that value. For example, the first "X" is the range "40 lb/MSF to about 50 lb/MSF."

TABLE 9

| | 40 | 50 | 60 | 70 | 80 | 90 | 100 | 105 | 110 | 120 | 130 | 140 | 150 | 160 | 170 | 180 | 190 |
|---|---|---|---|---|---|---|---|---|---|---|---|---|---|---|---|---|---|
| 50 | X | | | | | | | | | | | | | | | | |
| 60 | X | X | | | | | | | | | | | | | | | |
| 70 | X | X | X | | | | | | | | | | | | | | |
| 80 | X | X | X | X | | | | | | | | | | | | | |
| 90 | X | X | X | X | X | | | | | | | | | | | | |
| 100 | X | X | X | X | X | X | | | | | | | | | | | |
| 110 | X | X | X | X | X | X | X | | | | | | | | | | |
| 120 | X | X | X | X | X | X | X | X | | | | | | | | | |
| 130 | X | X | X | X | X | X | X | X | X | | | | | | | | |
| 140 | X | X | X | X | X | X | X | X | X | X | X | | | | | | |
| 150 | X | X | X | X | X | X | X | X | X | X | X | X | | | | | |
| 160 | X | X | X | X | X | X | X | X | X | X | X | X | X | | | | |
| 170 | X | X | X | X | X | X | X | X | X | X | X | X | X | X | | | |
| 180 | X | X | X | X | X | X | X | X | X | X | X | X | X | X | X | | |
| 190 | X | X | X | X | X | X | X | X | X | X | X | X | X | X | X | X | |
| 200 | X | X | X | X | X | X | X | X | X | X | X | X | X | X | X | X | X |

Thus, the finish weight can have a range between and including any of the aforementioned endpoints.

Surprisingly, the finish composition is particularly efficient in promoting water resistance and/or water barrier, while achieving or maintaining mechanical properties, and without requiring significant amount of finish, in accordance with embodiments of the invention, because the finish substantially penetrates the mat. For example, in some embodiments, the finish penetration depth can be at least about 60% of fiber mat thickness, such as a penetration of at least about 70%, or at least about 80% of fiber mat thickness. In embodiments of the invention, the finish penetration depth can be, e.g., as listed in TABLE 10 below. In TABLE 10, an "X" represents the range "from about [corresponding value in first row] to about [corresponding value in first column]." The indicated values represent the percentage of the mat thickness that is penetrated. For ease of presentation, it will be understood that each value represents "about" that value. For example, the first "X" is the range "greater than about 60% of fiber mat thickness to an amount greater than about 65% of fiber mat thickness."

TABLE 10

| | 60 | 65 | 70 | 75 | 80 | 85 |
|---|---|---|---|---|---|---|
| 65 | X | | | | | |
| 70 | X | X | | | | |
| 75 | X | X | X | | | |
| 80 | X | X | X | X | | |
| 85 | X | X | X | X | X | |
| 90 | X | X | X | X | X | X |

Thus, the finish penetration depth can have a range between and including any of the aforementioned endpoints.

Advantageously, the coating stays fluid and workable for at least 30 minutes without significant stiffening up. The combination of extended flow time retention agents in the finish is desirable. The invention achieves this advantage under ambient conditions and at elevated temperature. For example, in some embodiments, the finish setting and drying time (under ambient condition of 75° F./50% Relative Humidity (RH)) can be about 30 to about 60 minutes (e.g., about 30 to about 50 minutes, about 30 to about 45 minutes, about 30 to about 40 minutes, or about 30 to about 35 minutes). In embodiments of the invention, the finish setting and drying time (under ambient condition-75° F./50% RH) can be, e.g., as listed in TABLE 11 below. In TABLE 11, an "X" represents the range "from about [corresponding value in first row] to about [corresponding value in first column]." The indicated values represent the number of minutes for the finish to set and dry. For ease of presentation, it will be understood that each value represents "about" that value. For example, the first "X" is the range "from about 30 minutes to about 35 minutes."

TABLE 11

| | 30 | 35 | 40 | 45 | 50 | 55 |
|---|---|---|---|---|---|---|
| 35 | X | | | | | |
| 40 | X | X | | | | |
| 45 | X | X | X | | | |
| 50 | X | X | X | X | | |
| 55 | X | X | X | X | X | |
| 60 | X | X | X | X | X | X |

Thus, the finish setting and drying time (under ambient condition-75° F./50% RH) can have a range between and including any of the aforementioned endpoints.

H. Cementitious Article, Cementitious Board

The cementitious article of the present invention has a cementitious core. The cementitious core can comprise any material, substance, or composition containing or derived from gypsum and/or hydraulic cement, along with any suitable additives. Non-limiting examples of materials that can be used in the cementitious core include Portland cement, sorrel cement, slag cement, fly ash cement, calcium alumina cement, water-soluble calcium sulfate anhydrite, calcium sulfate α-hemihydrate, calcium sulfate β-hemihydrate, natural, synthetic or chemically modified calcium sulfate hemihydrates, calcium sulfate dihydrate ("gypsum," "set gypsum," or "hydrated gypsum"), and mixtures thereof. As used herein, the term "calcium sulfate material" refers to any of the forms of calcium sulfate referenced above. In gypsum boards, calcium sulfate hem ihydrate upon reaction with water eventually gets converted to calcium sulfate dihydrate. However, gypsum boards can contain some calcium sulfate hemihydrate which is formed due to overheating and dehydration of calcium sulfate dihydrate in the kiln.

The additives for the cementitious core can be any additives commonly used to produce cementitious articles, such as gypsum board or cement board. Such additives include, without limitation, structural additives such as mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, and the like. Examples of the use of some of these and other additives are described, for instance, in U.S. Pat. Nos. 6,342,284, 6,632,550, 6,800,131, 5,643, 510, 5,714,001, and 6,774,146, and U.S. Patent Publications 2004/0231916 A1, 2002/0045074 A1 and 2005/0019618 A1.

Preferably, the cementitious core comprises a calcium sulfate material, Portland cement, or mixture thereof. Advantageously, if desired, in some embodiments, the cementitious core also comprises a hydrophobic agent, such as a silicone-based material (e.g., a silane, siloxane, or silicone-resin matrix), in a suitable amount to improve the water resistance of the core material. It is also preferred that the cementitious core comprise a siloxane catalyst, such as magnesium oxide (e.g., dead burned magnesium oxide), fly ash (e.g., Class C fly ash), or a mixture thereof. The siloxane and siloxane catalyst can be added in any suitable amount, and by any suitable method as described herein with respect the method of preparing a water-resistant cementitious article of the invention, or as described, for example, in U.S. Patent Publications 2006/0035112 A1 or 2007/0022913 A1. Desirably, the cementitious core also comprises strength-improving additives, such as phosphates (e.g., polyphosphates as described in U.S. Pat. Nos. 6,342,284, 6,632,550, and 6,800,131 and U.S. Patent Publications 2002/0045074 A1, 2005/0019618 A1, and 2007/0022913 A1) and/or pre-blended unstable and stable soaps (e.g., as described in U.S. Pat. Nos. 5,683,635 and 5,643,510).

The cementitious core can comprise paper or glass fibers, but is preferably substantially free of paper and/or glass fibers (e.g., comprises less than about 1 wt. %, less than about 0.5 wt. %, less than about 0.1 wt. %, or even less than about 0.05 wt. % of paper and/or glass fibers, or contains no such fibers), wherein the wt. % is based upon weight of the cementitious core on a water free (dry) basis. For the purposes herein, the core can include one or more dense skim coats and/or hard edges, as is known in the art.

The cementitious article can be any of any type or shape suitable for a desired application. Non-limiting examples of cementitious articles include gypsum panels (also known as gypsum boards or gypsum based boards) and cement panels (also known as cement panels or cement based boards) of any size and shape. The term cementitious panel encompasses both a gypsum panel and a cement panel. A gypsum panel has over 50 wt. % gypsum in its core on a dry basis. A cement panel has over 20% Portland cement in its core on a dry basis. Optionally a cement panel further comprises gypsum and other additives.

In addition to boards the compositions of the present invention are useful as waterproof tile membranes for installation of tiles on floors and walls; waterproof roofing membranes; waterproof coatings for use over concrete floors and walls in interior applications; exterior waterproof coatings for use over concrete roofs, walls, balconies and foundations; exterior waterproof coatings for wall and roof sheathings; air and water barriers for exterior walls and roofs; colored and decorative coatings; fire-retardant coatings; coatings applied over wood-based materials, metals and plastics; crack filling and other construction repair products; skim-coat and patch products; statuary products.

FIG. 1 shows a schematic of a board 2 of the present invention. The board 2 comprises a cementitious core 10, two fibrous mats 20, and two coatings 30 of finish composition.

Figure 1A:
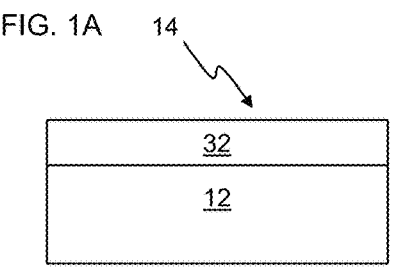
FIG. 1A illustrates a schematic diagram of a composite underlayment of the present invention.

The article can also be a poured, preferably self-leveling, flooring composition, for example a flooring underlayment, having the cementitious layer and the hydrophobic finish facing the cementitious layer. FIG. 1A illustrates a schematic diagram of a composite underlayment 14 of the present invention comprising a cementitious layer 12 and a coating 32 of the hydrophobic finish composition. The cementitious layer is typically a cement-based layer or a gypsum based layer. The term cementitious layer encompasses both a gypsum layer and a cement layer. A gypsum layer has over 50 wt. % gypsum in on a dry basis. A cement layer has over 20% Portland cement on a dry basis. Optionally the cement layer comprises gypsum and other additives.

Also, the finish composition is useful to give favorable properties to one or more sides of an article. A finish for use as an underlayment of ceramic tile can be prepared preferably by rolling or screeding the hydrophobic finish composition of the invention onto a reinforcing fibrous basemat or scrim. The coated product in the form of a membrane can then be used as a substrate on floors and walls for installation of ceramic tiles and synthetic stones. Statuary or architectural moldings could be made of a different core, then finished with sufficient thickness of this composition to allow the piece to be shaped, carved, fit or detailed using common tools.

Product according to some embodiments of the invention achieves desirable strength and flexibility properties in addition to the water resistance and/or waterproofness properties. To this end, product according to embodiments of the invention achieves water resistance and water impermeability without becoming undesirably too brittle or otherwise compromising strength.

Thus, in some embodiments, product according to the invention meets the product specifications set forth in ASTM C1178/C1178M-13. For example, with respect to nail pull resistance, product according to some embodiments of the invention have a nail pull resistance of at least about 40 pounds, such as at least about 70 pounds, or at least about 90 pounds. The nail pull resistance may vary depending on the thickness of a board. In the case of ¼" board thickness, the nail pull resistance in accordance with embodiments of the invention is at least about 40 pounds. In the case of ½" board thickness, the nail pull resistance, in accordance with some embodiments of the invention is at least about 70 pounds. In the case of ⅝" board thickness, the nail pull resistance in accordance with some embodiments of the invention is at least about 90 pounds.

Product according to embodiments of the invention also exhibit desirable flexural strength properties. For example, in some embodiments, the flexural strength is at least about 40 pounds (e.g., at least about 80 pounds, or at least about 100 pounds) bearing edges parallel to the board edge, or at least about 50 pounds (e.g., at least about 100 pounds, or at least about 140 pounds) bearing edges perpendicular to the board edge. The flexural strength may vary depending on board thickness. In the case of ¼" board thickness, the flexural strength in some embodiments is at least about 40 pounds bearing edges parallel to the board edge, and/or about 50 pounds bearing edges perpendicular to the board edge. In the case of ¼" board thickness, the flexural strength in some embodiments is at least about 80 pounds bearing edges parallel to the board edge, and/or at least about 100 pounds bearing edges perpendicular to the board edge. In the case of ⅝" board thickness, the flexural strength in some embodiments is at least about 100 pounds bearing edges parallel to the board edge, and/or at least about 140 pounds bearing edges perpendicular to the board edge.

Product according to the invention also achieves desirable core, end, and edge hardness, as well as desirable surface water absorption, humidified deflection, and shear bond strength. For example, in some embodiments, the average core, end, and edge hardness is at least about 15 pounds. The average surface water absorption of the face side of the board in some embodiments is not more than about 0.50 grams after 2 hours of elapsed time. Regarding humidified deflection, the average deflection of the boards in some embodiments is not more than about 2 inches, such as not more than about 1 inch. The humidified deflection may vary depending on board thickness. In the case of the ½" thick board, in some embodiments, the average humidified deflection is not more than about 2 inches. In the case of ⅝" thick board, the average humidified deflection is not more than about 1 inch. The shear bond strength in some embodiments of the invention is at least about 50 psi when tested in accordance with ASTM C1325. In some embodiments, the finish composition has a pH of at least about 9, such as at least about 9.5, or at least about 10.

In an embodiment, when the board is cast as ½" thick board (overall board thickness, not merely the core), the board has a nail pull resistance of at least about 70 pounds in accordance with ASTM C1178/C1178M-13.

In another embodiment, when the board is cast as ½" thick board, the board has a flexural strength of at least about 80 pounds bearing edges parallel to the board edge and/or at least about 100 pounds bearing edges perpendicular to the board edge, in accordance with ASTM C1178/C1178M-13.

I. Water Resistance

Preferably the surface water absorption of the cementitious boards of the present invention is less than 0.5 grams, more preferably less than 0.4 grams, and most preferably less than 0.3 grams, as measured in accordance to ASTM C1178.

Embodiments of the present invention impart an improved water resistance, such as for mat-faced applications, and in some embodiments, the product of the invention can achieve substantial impermeability to water to allow for water barrier properties. Preferably boards according to the present invention pass the test for waterproofness under the American National Standards Institute (ANSI) standard ANSI A118.10 (revised, October 2008), which modifies ASTM D4068-09 (Annex 2: Hydrostatic Pressure Test). The waterproof test is conducted with a hydrostatic head of 24 inches on the sample. The product according to the invention not only exhibits desirable water resistance properties, but also in some embodiments exhibits waterproofness. As such, product according to embodiments of the invention is useful in applications where such water impermeability property is particularly desirable, as described herein. Passing the waterproofness standard advantageously can allow product in accordance with embodiments of the invention to be used in areas subject to waterproof standards under international building and residential codes.

J. Method of Preparing the Cementitious Article

The cementitious article can be prepared, including application of the above-described finish composition to form a composite, by any suitable method including, but not limited to, the inventive methods described herein, and, e.g., as described in corresponding, commonly-assigned U.S. patent application Ser. No. 13/837,041, filed Mar. 15, 2013, entitled "Method of Preparing Mat-Faced Article," (US Patent Application Publication No. 2014/0261954) and commonly-assigned U.S. patent application Ser. No. 13/835,556, filed Mar. 15, 2013, entitled "Cementitious Article Comprising Hydrophobic Finish," (US Patent Application Publication No. 2014/0272402) both of which are incorporated herein by reference.

Embodiments of a method of preparing a fibrous mat-faced cementitious article according to the invention comprise (a) depositing a cementitious slurry on a first fibrous mat comprising polymer or mineral fibers, wherein the first fibrous mat comprises a hydrophobic finish (the above described finish composition) on at least one surface thereof, and the cementitious slurry is deposited on the hydrophobic finish, and (b) allowing the cementitious slurry to harden, thereby providing a fibrous mat-faced cementitious article.

The method of preparing a cementitious article in accordance with the invention can be conducted on existing gypsum board manufacturing lines used to make fibrous mat-faced cementitious articles known in the art. Briefly, the process typically involves discharging a fibrous mat material onto a conveyor, or onto a forming table that rests on a conveyer, which is then positioned under the discharge conduit (e.g., a gate-canister-boot arrangement as known in the art, or an arrangement as described in U.S. Pat. Nos. 6,494,609 and 6,874,930) of a mixer. The components of the cementitious slurry are fed to the mixer comprising the discharge conduit, where they are agitated to form the cementitious slurry. Foam can be added in the discharge conduit (e.g., in the gate as described, for example, in U.S. Pat. Nos. 5,683,635 and 6,494,609). The cementitious slurry is discharged onto the fibrous mat facing material. The slurry is spread, as necessary, over the fibrous mat facing material and optionally covered with a second facing material, which may be a fibrous mat or other type of facing material (e.g., paper, foil, plastic, etc.). The wet cementitious assembly thereby provided is conveyed to a forming station where the article is sized to a desired thickness, and to one or more knife sections where it is cut to a desired length to provide a cementitious article. The cementitious article is allowed to harden, and, optionally, excess water is removed using a drying process (e.g., by air-drying or transporting the cementitious article through a kiln). Each of the above steps, as well as processes and equipment for performing such steps, are known in the art. It also is common in the manufacture of cementitious articles such as gypsum and cement board to deposit a relatively dense layer of slurry onto a facing material before depositing the primary slurry, and to use vibration to eliminate large voids or air pockets from the deposited slurry. Also, hard edges, as known in the art, are sometimes used. These steps or elements (dense slurry layer, vibration, and/or hard edges) optionally can be used in conjunction with the invention. An aqueous cementitious finish composition is applied to the outside mat surface to form the mat-faced cementitious article composite.

The polymer may be added as a dispersion including from about 30 to about 75% solids and a mean polymer particle size of from about 70 to about 650 nm. The polymer is preferably present in the aqueous coating composition in an amount from about 5 to about 60 percent by weight, and more preferably from about 8 to about 40 percent by weight.

All aspects of the fibrous mat, core ingredients, and finish composition ingredients used in accordance with the method of preparing a cementitious article are as described by the present specification with respect to the cementitious article of the invention.

In one aspect, the mat-faced gypsum article comprises a mat having an inner surface adjacent to a cementitious core and an opposite outer surface. An aqueous cementitious finish composition is applied to the outside surface to form the mat-faced cementitious article composite. Desirably, the finish composite can suitably be applied by a roller assembly (such as that of US Published Patent Application No. 2014/

0261954 to Dubey et al) comprising a finish roller. In some embodiments, the finish roller has an uneven surface, including, for example, grooves or depressions (e.g., circumferential or longitudinal) defined therein.

Figure 2A:
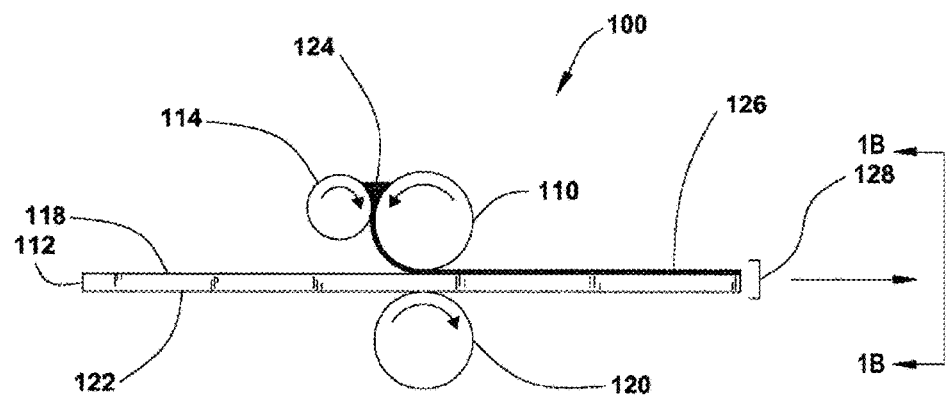
FIG. 2A is a schematic side view illustrating a roller assembly comprising a finish roller with circumferential grooves defined therein applying a hydrophobic finish composition to a mat-faced cementitious board with the assembly in a direct finish orientation, in accordance with embodiments of the invention.

FIG. 2A shows a schematic side view illustrating a roller assembly for making a composite board of the present invention comprising a finish roller with circumferential grooves defined therein applying a hydrophobic finish composition to a mat faced cementitious board with the assembly in a direct finish orientation, in accordance with an embodiment of the invention.

Figure 2B:
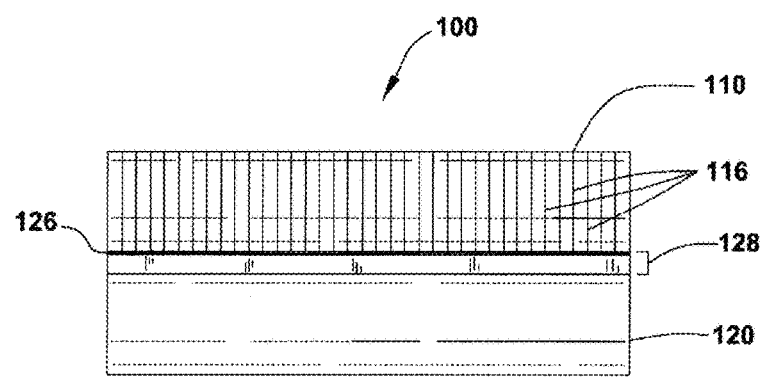
FIG. 2B is a front schematic view of the roller assembly taken along the line 1B-1B depicted in FIG. 2A.
Figure 5:
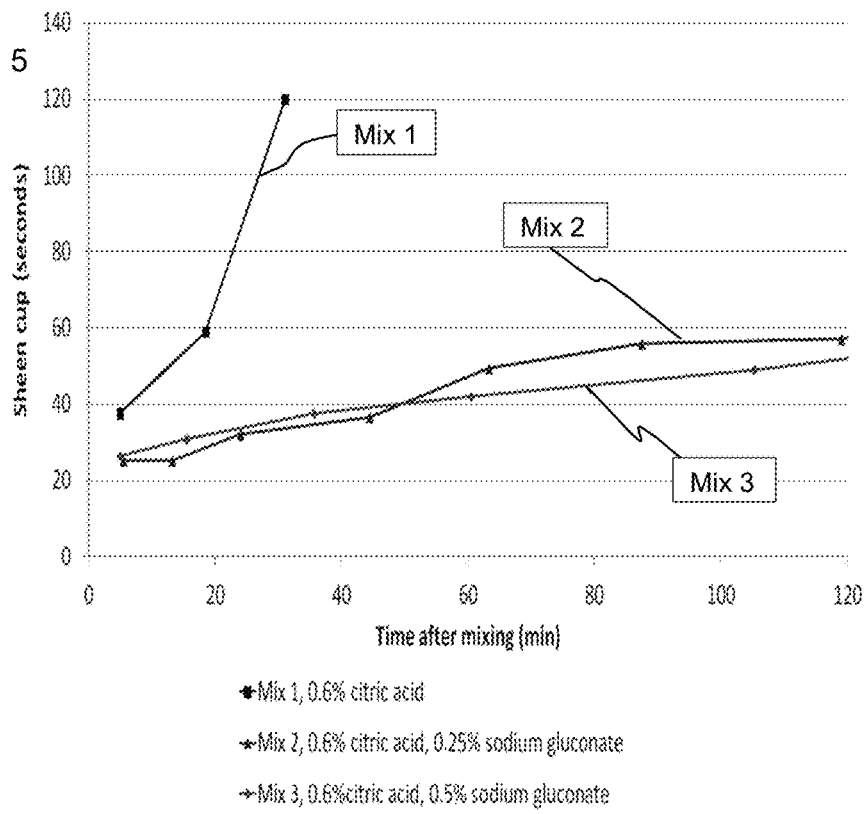
FIG. 5 shows a plot of Sheen cup flow time readings for three mixtures of Example 1.

One exemplary embodiment for applying finish composition to a mat-faced board (e.g., gypsum board) is depicted in FIGS. 2A-2B, which show a direct application orientation of a roller assembly 100 such that a finish roller 110 rotates in the same direction that the mat-faced board 112 travels as described below. Thus, the finish roller 110 rotates in a direction so its surface moves in the same direction as the board moves. In contrast, in reverse finishing configurations, described below in connection with FIGS. 3A-3B, the finish roller rotates in reverse so its surface in contact with the board is moving in the opposite direction that the board moves.

Roller assembly 100 also includes a doctor roller 114 which engages with finish roller 110. Rollers 110 and 114 are mounted with brackets journaled to allow for rotation and extend from columns mounted on the building floor or table on which the board travels. One or both of the rollers 110 and 114 are driven by a motor. In some embodiments, the finish roller 110 and doctor roller 114 are driven, e.g., by independent, variable speed, drive assemblies. This can be advantageous in some embodiments to allow the finish roller 110 speed and doctor roller 114 speeds to be varied independently, as desired. In other embodiments, one of the rollers 110 or 114 is driven while the other roller 110 or 114 is an idler such that it rotates by engagement with the driven roller such that it rotates in response to the roller being driven.

The doctor roller 114 engages with the finish roller 110. Particularly, the doctor roller 114 mates with the finish roller 110 to form a trough between the two, where the finish composition is introduced. The finish roller 110 and the doctor roller 114 generally counter-rotate, i.e., rotate in opposite directions relative to one another, both in direct finishing or reverse finishing configurations (described below). Having the finish roller 110 and doctor roller 114 engage in this manner facilitates keeping the slurry in the gap between the two rollers so that so that the slurry does not spill. The position of the doctor roller 114 is adjusted relative to the finish roller 110. This may result in a small gap between the two rollers, which can be adjusted to control the amount of slurry allowed to pass between them, which in turn influences the amount of finishing composition to be applied. In some embodiments, particularly in direct finishing arrangement, this gap may actually be negative indicating an interference fit as that term is understood in the art, thereby indicating that the doctor roller 114 is touching, and compressing the surface of, the finish roller 110.

As best seen in FIG. 2B, the finish roller 110 includes grooves 116 circumferentially disposed in the surface of the finish roller 110. In the direct application orientation, doctor roller 114 is upstream of finish roller 110 to minimize the surface area of finish roller 110 bearing the finish composition. In this respect, it has been found that increasing the surface area (beyond, e.g., 90 degree, 100 degree, 120 degree, etc) of the portion of finish roller 110 that bears finish composition increasingly results in undesirable variation in the finish application. A top surface 118 of the board 112 as shown is adjacent to the finish roller 110. A bottom roller 120 is disposed under a bottom surface 122 of the board 112. The board is generally supported by a roller conveyor, chain conveyor, belt conveyor, or the like at the pass line height, i.e., the same elevation as the top of the bottom roller 120. For example, the bottom roller 120 can optionally work in concert with other rollers which help transport board into and out of the assembly roller 100.

Hydrophobic finish composition is dispensed between finish roller 110 and doctor roller 114 to feed the composition between the finish roller 110 and doctor roller 114 and onto the surface of the finish roller 110 for application to top surface 118 of board 112. A head 124 of the finish composition slurry forms between the doctor roller 114 and the finish roller 110. The head can be controlled by sensor such as laser control as understood in the art. The surface of the finish roller 110 pulls finish composition onto the board 112 to deposit the finish composition onto the top surface 118 to lay a finish 126 and form a composite 128. The bottom roller 120 provides underlying support and is generally aligned under the finish roller 110.

Another exemplary embodiment for applying a finish composition to a mat-faced board (e.g., gypsum board) is depicted in FIGS. 3A-3B, which show a reverse application orientation of a roller assembly 200 such that a finish roller 210 rotates in the opposite or counter direction that the mat-faced board 212 travels. Roller assembly 200 includes a doctor roller 214 which engages with finish roller 210 in counter-rotation. As best seen in FIG. 2B, the finish roller 210 includes grooves 216 that are circumferentially disposed in the surface of the roller 210. In the reverse application orientation, doctor roller 214 is downstream of finish roller 210 to minimize the surface area of the finish roller 210 that bears the finish composition. A top surface 218 of the board 212 as shown is adjacent to the finish roller 210. A bottom roller 220 is disposed under a bottom surface 222 of the board 212. The bottom roller 220 may have a cover formed from, for example, rubber or elastomeric material such as neoprene, to achieve traction on the bottom surface 222, to ensure board travels at the desired speed and desired direction, despite the frictional force of the finish roll 210.

Finish composition is dispensed between finish roller 210 and doctor roller 214. A head 224 of the finish composition slurry forms between the doctor roller 214 and the finish roller 210. The finish roller 210 acts to apply the finish composition onto the top surface 218 to lay a finish 226 and form a composite 228. Other aspects of the embodiment set forth in FIGS. 2A-2B, such as driver for the roll, the mounting thereof, and the presence of other bottom rollers, are similar to the description set forth relative to FIGS. 1A-1B as described above.

Generally, in both embodiments depicted in FIGS. 2A, 2B, 3A, and 3B, doctor roller 114 or –214 has a smaller diameter than finish roller 110 or 210 because the highest elevation of both the doctor roller 114 and finish roller 110 typically is at the same elevation (or with axes at substantially coinciding elevation), and the lowest elevation of the doctor roller 114 or 214 should be higher than the surface to be finished, to avoid interference with the article being finished. The grooves 116 and 216 can be in any suitable configuration. For example, the finish roller 110 or 210 can comprise a buttress thread form to define the grooves in some embodiments. In embodiments including the buttress thread configuration, any suitable buttress thread count per longitudinal inch of the roller can be used.

In these and other embodiments, each roller piece in the roller assembly can be independently driven and varied to allow fine tuning the finishing. As noted herein, the bottom roller can optionally be a part of a larger section of rollers used in conveyors for moving board down a manufacturing line. For example, in some embodiments, a series of rollers can be driven with one drive and linked together (e.g., with chains, belts, or the like). However, in some embodiments, the bottom roller can have its speed independently varied relative to other conveying rollers to thereby allow more precise control of the bottom roller of the roller assembly of embodiments of the invention, e.g., so as to regulate the speed of the bottom roller to correspond with the speed of the board.

The bottom roller in accordance with embodiments of the invention is a supporting roller opposing the finish roller. For example, the finish roller advantageously can keep the board being treated with finish composition at the desired elevation (path line height) while also enhancing traction to drive the board in the proper direction and substantially constant rate down the manufacturing line. The bottom roller further facilitates having an even finish thickness on the outer surface of the board. For example, the roller reduces the chance for roller slippage over the board to which the finish is being applied. Such slippage can undesirably result in variation in thickness of the applied finish composition. In some embodiments, as an alternative to a bottom roller, a plate such as an anvil plate can be used.

The vertical gap between the finish roller and bottom roller can be adjusted to accommodate different clearances between them, e.g., to accommodate different board thickness. In some embodiments, the bottom roller remains stationary while the finish roller is moved up and down to adjust the gap. However, other variations are possible, including having the height of the bottom roller adjustable or having both the finish roller and the bottom roller being adjustable.

The doctor roller typically is formed at least in part with suitable metal. For example, in some embodiments, the metal is steel such as stainless steel to avoid rusting given that the finish composition is normally in the form of aqueous slurry. The surface can be plated with chrome or the like to allow the doctor roller to remain as clean as possible in operation.

The composition of the finish roller may vary, e.g., depending on whether a direct finishing or reverse finishing arrangement is employed. For example, in some embodiments of a direct finishing arrangement, the finish roller can be formed of metal with a softer cover such as formed from one or more rubbers or elastomeric material such as neoprene, ethylene propylene diene monomer (EDPM) rubber, or the like. In this respect, it is understood that the article to be finished, including mat-faced board, are not perfectly flat because of, e.g., surface imperfections. Thus, in accordance with embodiments of the invention, a cover (e.g., made of rubber material) can be used to conform to surface imperfections in the board or other article to allow for an even more finish. Rubbers are desirable materials for this purpose because of compressibility property and long wear life. They also tend to be materials that are easy to keep clean. The use of a steel finish roller can be less desirable in some embodiments of direct finishing arrangements. For example, where surface imperfections are prevalent, a steel finish roller is less apt to conform to the surface. The applied finish will have variation with a thicker finish being observed where there are depressions in the board surface and a thinner finish observed where there are protrusions in the board surface.

However, in some embodiments, such as some reverse finish arrangements, the finish roller can be formed from metal such as steel to reduce wear. In this respect, where the finish roller is rotating in a direction opposite as the board is traveling, the finish roller will exhibit undesirable wear characteristics in operation if the finish roller is made of softer material such as rubber. Furthermore, a rubber finish roller may at times create excessive traction such that the board undesirably could be pushed backwards.

It will be understood that the grooves, if present, can be in any suitable configuration. Grooves advantageously allow for more surface area for finish to be applied. The grooves can be cut into the rubber cover and/or into a metal roller in various embodiments, with grooves being particularly advantageous in rubber covered embodiments of finish roller because rubber in some embodiments is easier to clean. In some embodiments, the finish roller comprises a buttress thread form to define the grooves in some embodiments. In embodiments including the buttress thread configuration, any suitable buttress thread count per longitudinal inch of the roller can be used. For example, in some embodiments, the finish roller has from about 4 to about 50 buttress thread per inch of longitude, such as from about 8 to about 12 buttress thread per inch, e.g., about 10 buttress thread per inch.

In some embodiments, the finish roller has a longitudinal axis and the groove(s) are circumferential such that they are perpendicular, or nearly perpendicular, to the axis. The grooves can have any suitable depth, such as a depth from about 0.001 inch to about 0.25 inch, e.g., from about 0.05 inch to about 0.20 inch. The grooves can have any suitable width, for example, from about 0.001 inch to about 0.25 inch, such as from about 0.08 inch to about 0.012 inch.

The size of the rollers can vary. For example, the radius of the finish roller is dependent on the line speed of the article being finished, and the viscosity of the finish composition. The length of the finish roller is dependent on the width of the panels being finished and normally the length of the roller is somewhat longer than the width of the product, e.g., 10 to 15% longer, for example, to ensure the product is finished across the entire width. The radius of the doctor roller may be dependent on the radius of the finish roller, speed of doctor roller, finish viscosity, etc. In some embodiments, the doctor roller has a smaller diameter than the finish roller so that its axis is substantially the same elevation as the axis of the finish roller, while its bottom surface is above the top surface of the panel 218. The length of the doctor roller should normally be the same as the length of the finish roller, with dams on the ends of these rollers, to prevent slurry from spilling over.

The finish roller is normally fabricated from steel, and can have one or more covers with any suitable hardness. In some embodiments, the hardness of the finish roller is selected to be softer than the doctor roller to allow the doctor roller to compress the finish roller as the rollers engage which is advantageous in controlling the amount of finish composition to be deposited. For example, the cover(s) can be such that the finish roller can have a hardness of about 100 Durometer or less as determined according to Shore-A, such as about 70 Durometer Shore-A or less, e.g., about 40 Durometer Shore-A, with the doctor roller desirably having higher corresponding hardness value than the selected value for the finish roller in some embodiments. If desired, the finish roller cover(s) comprises neoprene, EPDM, or a combination thereof to help reduce surface hardness while maintaining a harder core in some embodiments. For direct finish configurations, desirably the finish roller can be formed from rubber in order to allow if to conform to the imperfect surface of the board, resulting in a more uniform finishing thickness. In reverse finish configurations, a roller with no cover can be used in some embodiments, e.g., a chrome-plated smooth steel finish roller because this allows for greater resistance to wear, while also minimizing frictional force against the top surface of the board 218, and minimizing the amount of finishing adhering on the roller surface.

The gap between adjacent surfaces of the doctor roller and finish roller in some embodiments are in an interference fit such that the gap is defined by a negative number as understood in the art. The negative numbers refer to the amount of interference, for example, the difference between the sum of the outmost radii of the finish roller and the doctor roller, and the actual distance between axes of these two rollers. In some embodiments where the finish roller is generally softer than the doctor roller, the doctor roller can compress the finish roller when the rolls are positioned this way. The gap between the doctor roller and finish roller may be adjusted depending on factors including the viscosity of the finishing composition, the speed of the rollers, and whether direct or reverse roller configurations are employed. In direct roller finishing, the finish roller and the doctor roller are disposed to define a gap therebetween in some embodiments from about +0.010 inch (about +0.025 cm) to about −0.020 inch (about −0.051 cm), such as from about −0.005 inch (about −0.013 cm) to about −0.010 inch (about −0.025 cm), e.g., about −0.007 inch (about −0.018 cm). In reverse finishing arrangements, the gaps can be somewhat larger, e.g., from zero to about +0.010 inch in some embodiments.

In some embodiments, the roller assembly is configured such that a gap between the finish roller and the bottom roller is less than the average panel thickness by about 0 inch (about 0 cm) to about 0.10 inch (about 0.25 cm), such as by about 0.01 inch (about 0.25 cm) to about 0.08 inch (about 0.20 cm), e.g., by about 0.02 inch (about 0.51 cm) to about 0.06 inch (about 0.15 cm).

To make the hydrophobic cementitious finish composition, the hydraulic component, polymer, silane compound, extended flow time retention agent, water and any optional components are combined in a mixer and mixed until a homogeneous blend is obtained. Preferably, the mixer is a high shear mixer providing a short residence time. For small batches of product, a typical laboratory blender is a suitable mixing device. For larger industrial operations, the use of commercially available continuous mixers, e.g., as manufactured by the PFT GMBH and Co. KG, based in Iphofen, Germany, are suitable. Continuous mixers have the capability of mixing as well as pumping the slurry in a continuous manner to the point of application. These mixers have a mixing chamber where all solid dry materials are blended together with the liquid additives including water using a cage agitator rotating at a high speed. In the normal mode of operation, the blended cementitious slurry continuously exits the mixing chamber and is pumped forward by a progressive cavity pump (rotor-stator type pump) to the point of application. The preferred PFT mixer models for this invention include PFT Mixing Pump G4, PFT Mixing Pump G5, PFT MONOJET 2.13, PFT Mixing Pump T2E, PFT Mixing Pump MS1 and MS2.

Another preferred mixer is a high-shear batch mixer. The batch mixer is preferred in some applications, particularly where the slurry must be fed to more than one area of the manufacturing line. The wet ingredients are charged to the mixer, followed by the dry components. After mixing, the entire batch is dumped into a pot for continuous distribution to the line. If distribution to more than one location is desired, multiple pumps with separate destinations can be used to distribute slurry from the pot.

After mixing, the flowable slurry exits from the mixer and can be poured into a mold or extruder, onto release paper or onto a base mat for shaping into an appropriate shape. Any method may be used to shape the composition, including molding, extruding, troweling, calendaring, rolling, screeding, or any shaping method suitable for the article being produced.

Thus, in an embodiment, a mat-faced gypsum board made as discussed above comprises gypsum based core, fibrous mat having an inner surface facing at least one face of the gypsum-based core, and hydrophobic cementitious finish composition comprising hydraulic component comprising Class C fly ash, film-forming polymer, a silane compound, and an extended flow time retention admixture. Each of these ingredients, and their preferred embodiments, for use in the method of making the hydrophobic finish composition are the same as described by the present specification with respect to the cementitious article of the invention.

Preferably, the film-forming polymer is in an amount from about 5% to about 25% by weight of the wet finish. This is weight percent of dry polymer based on total weight of the wet (water included) finish composition.

Preferably, the finish has a pH of at least about 9.

Preferably, the fibrous mat comprises polymer or mineral fiber.

Preferably, the polymer or mineral fibers are glass fibers, polyester fiber, or any combination thereof.

Preferably, the mat and finish form a composite having a thickness of about 0.075 inches or less, more preferably, 0.05 inches or less, most preferably, 0.03 inches or less. A preferred lower limit is 0.01 inches.

Preferably, the mat and finish form a composite having a density from about 75 to about 115 pcf.

Preferably, the finish has a weight from about 60 lb/MSF to about 160 lb/MSF.

Preferably, the cementitious hydrophobic finish composition penetrates at least about 80% into the mat.

Preferred Coating Drying Temperature Versus Drying Time

Preferably, the hydrophobic finish composition sets and dries in about 30 to about 60 minutes under conditions of 75° F. and 50% relative humidity (RH) when used as a coating, particularly during manufacture of the cementitious articles of the present invention. Preferably, the hydrophobic finish composition substantially sets and dries in about 30 to about 45 minutes at a temperature of about 175° F. Preferably, the hydrophobic finish composition substantially sets and dries in about 3 minutes or less at a temperature of about 400° F.

Preferably, the fibrous mat comprises two parts, with one part on either side of the core to form a sandwich structure.

Preferably, the hydrophobic finish composition faces both parts of the mat.

Preferably, the hydrophobic finish composition comprises,
  the film-forming polymer of the finish composition comprises one or more of the following polymers: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and VeoVa (vinyl ester of versatic acid), copolymers of vinyl laurate and ethylene, terpolymers of vinyl acetate, ethylene and methylmethaacrylate, terpolymers of vinyl acetate, ethylene and vinyl laurate, terpolymers of vinyl acetate, ethylene and VeoVa (vinyl ester of versatic acid), and any combination thereof, wherein the film-forming polymer is in an amount from about 5% to about 25% by weight of the wet finish, the silane compound is an alkyl alkoxysilane in an amount equal to from about 0.1% to about 5% by weight of the wet finish (water included basis), an extended flow time retention agent comprising either one or more carboxylic acids, salts of carboxylic acids, or mixtures thereof in an amount from about 0.05 to 1.00 percent by weight on a water free basis of the hydraulic component, the board passes the test for waterproofness according to ANSI A118.10 (revised October 2008), when the board is cast as a ½" thick board, the board has a nail pull resistance of at least about 70 pounds in accordance with ASTM C1178/C1178M-13, when the board is cast as ½" thick board, the board has a flexural strength of at least about 80 pounds bearing edges parallel to the board edge and/or at least about 100 pounds bearing edges perpendicular to the board edge, in accordance with ASTM C1178/C1178M-13, the hydraulic component is in an amount from about 50% to about 85% by weight of the wet finish, and/or the finish has a pH of at least about 9.

Preferably, the hydrophobic finish composition comprises, consists of, or consists essentially of:

hydraulic component comprising Class C fly ash in an amount from about 50 to about 85 percent by weight of the wet finish composition (wet finish composition means including water), film-forming polymer in an amount from about 5 to about 25 percent by weight of the wet finish composition, alkyl alkoxysilane in an amount from about 0.1 to about 5 percent by weight of the wet finish composition, an extended flow time retention agent comprising either one or more carboxylic acids, salts of carboxylic acids, or mixtures thereof in an amount from about 0.05 to 1.00 percent by weight based on dry (water free) weight of the hydraulic component, filler in an amount from about 0 to about 50 percent by weight of the finish composition, water reducing admixture in an amount from about 0 to about 5 percent by weight of the wet finish composition, colorant in an amount from about 0 to about 2 percent by weight of the wet finish composition, other optional additives in an amount from about 0 to about 20 percent by weight of the wet finish composition, and water in an amount from about 5 to about 30 percent by weight of the finish composition.

Optional additives include water reducing admixtures, rheology modifiers, thickeners, gums, air entraining agents, defoamers, reinforcing fibers, colorants, wetting agents, solvents, film forming and coalescing agents, set accelerators, set retarders, preservatives, biocides, bio-polymers, lightweight fillers, hydraulic cements, pozzolans, and inorganic fillers such as calcium carbonate, talc, clays, mica, pozzolanic admixtures, sand, silica, alumina, iron oxide, etc.

In another embodiment, the mat and hydrophobic finish form a composite having a thickness from about 0.0075 to about 0.040 inches and a density from about 65 to about 125 pcf (pounds per cubic foot), wherein the finish has a weight from about 40 to about 200 lb/MSF (pounds per thousand square feet), the hydrophobic finish composition penetrates at least about 60% into the mat, and the finish has a pH of at least about 9. Also, in this embodiment the finish substantially sets and dries in about 30 to about 60 minutes under conditions of about 75° F. and about 50% relative humidity, and the finish substantially sets and dries in about 30 to about 45 minutes at a temperature of about 175° F. Further, in another embodiment, the finish substantially sets and dries in about less than 3 minutes at a temperature of about 400° F.

In a preferred embodiment, the mat and finish form a mat-faced gypsum board comprising the following:

A gypsum based core, fibrous mat comprising polymer or mineral fiber, wherein the mat has an inner surface facing at least one face of the gypsum-based core, and hydrophobic finish composition consisting essentially of:

hydraulic component comprising Class C fly ash in an amount from about 50% to about 85% by weight of the wet (water included basis) finish, one or more of the following film-forming polymers: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and VeoVa (vinyl ester of versatic acid), copolymers of vinyl laurate and ethylene, terpolymers of vinyl acetate, ethylene and methylmethaacrylate, terpolymers of vinyl acetate, ethylene and vinyl laurate, terpolymers of vinyl acetate, ethylene and VeoVa (vinyl ester of versatic acid), and any combination thereof, wherein the film-forming polymer is in an amount from about 5% to about 25% by weight of the wet finish, alkyl alkoxysilane in an amount from about 0.1% to about 5% by weight of the wet finish, an extended flow time retention agent comprising either one or more carboxylic acids, salts of carboxylic acids, or mixtures thereof in an amount from about 0.05 to 1.00 percent by weight of the hydraulic component.

In another embodiment, the mat and finish form a board comprising (a) gypsum-based core, (b) fibrous mat comprising polymer or mineral fiber, wherein the mat has an inner surface facing at least one face of the gypsum-based core, and (c) hydrophobic finish composition consisting essentially of a hydraulic component comprising Class C fly ash, film-forming polymer, alkyl alkoxysilane, and an extended flow time retention agent comprising either one or more carboxylic acids, salts of carboxylic acids, or mixtures thereof. The hydraulic component comprising Class C fly ash can be, for example, in an amount from about 50% to about 85% by weight of the wet finish composition. The film-forming polymer can be, for example, in an amount from about 5% to about 25% by weight of the wet finish composition.

In embodiments in which the hydrophobic finish composition consists essentially of hydraulic component comprising Class C fly ash, film-forming polymer, and silane compound, and an extended flow time retention agent comprising either one or more carboxylic acids, salts of carboxylic acids, or mixtures thereof, the embodiments preclude the inclusion of any compound other than the aforesaid hydraulic component comprising Class C fly ash, film-forming polymer, alkyl alkoxysilane, and an extended flow time retention agent comprising either one or more carboxylic acids, salts of carboxylic acids, or mixtures thereof, that materially affects the inventive composition (e.g., compounds that considerably hamper the water resistance effect or adversely reduce strength or flowability significantly).

Thus, compounds that would be excluded in a finish composition consisting essentially of hydraulic component comprising Class C fly ash, film-forming polymer, alkyl alkoxysilane, and an extended flow time retention agent comprising either one or more carboxylic acids, salts of carboxylic acids, or mixtures thereof, would include fillers, aggregate, or calcium carbonate with a mean particle size above 3000 microns; silica, alumina, or iron oxide in a combined amount above 50% by weight of the hydraulic component; Portland cement in an amount above 50% by weight of the hydraulic component; quick lime in an amount above 10% by weight of the hydraulic component; and hydrated lime in an amount above 25% by weight of the hydraulic component.

Compounds that would not be excluded in a finish composition consisting essentially of hydraulic component comprising Class C fly ash, film-forming polymer, alkyl alkoxysilane, and an extended flow time retention agent comprising either one or more carboxylic acids, salts of carboxylic acids, or mixtures thereof and compounds that do not materially affect the finish composition, such as water, defoamers, fillers such as mica, clays, gums, preservatives, solvents and other additives (e.g., binders, alcohols, biocides, colorings), water reducing admixture additives, as well as other compounds that do not considerably hamper the water resistance effect or adversely reduce strength or flowability significantly when in a finish composition.

In another embodiment, the mat and finish form a composite having a thickness from about 0.0075 to 0.040 inches and a density from about 65 to about 125 pcf, wherein the finish has a weight from about 40 to about 200 lb/MSF, the finish penetrates at least about 60% into the mat, and the finish has a pH of at least about 9, and the finish substantially sets and dries in about 30 to about 60 minutes under conditions of about 75° F. and about 50% relative humidity, and the finish substantially sets and dries in about 30 to about 45 minutes at a temperature of about 175° F.

In another embodiment, an article comprises a cementitious core material and a finish composition facing the cementitious core, wherein the finish composition comprises Class C fly ash, film-forming polymer, silane compound, wherein the silane is (a) within the general chemical formula (I):

$(R^1O)_m$—Si—$X_{4-m}$      (I), where $R^1O$ is an alkoxy group, X is an organofunctional group, and m ranges from 1 to 3 and/or (b) has a molecular weight of at least about 150, and an extended flow time retention agent comprising either one or more carboxylic acids, salts of carboxylic acids, or mixtures thereof, wherein if the silane is a polymer the molecular weight of at least about 150 is a weight average molecular weight.

The preceding are merely examples of embodiments. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

EXAMPLES

Tested product consists of glass-mat faced gypsum baseboard, and finish coating composition which provides water resistance. The ½ inch gypsum baseboard uses the mold tough formulation at 1600 lb/MSF, and the ⅝ inch baseboard uses the formulation for glass-mat interior board at 2400 lb/MSF. The finishing coating was made of fly ash that promotes tile bond, and acrylic polymer for water resistance. The finish coating application rate was 120-150 lb/MSF, about ⅓ of which by weight is acrylic polymer. The final product weight is approximately 1725 lb/MSF for ½ inch and 2525 lb/MSF for ⅝ inch panel. The product will be made on a plant specialty line.

The major components of the finish coating are class C fly ash to promote tile bond, and acrylic polymer for water resistance, silane, and extended flow time retention agent. In plant production, the coating is applied to the glass mat baseboard, and dried in an oven for a few minutes. The drying action drives off the moisture in the polymer so it can form a layer of film. The dried boards are then stacked in units ready for shipment. Class C fly ash used in the coating has cementitious properties and reacts with water. This reaction, depending on the reactivity of fly ash, stiffens the mixture and makes it difficult to work with. Since the curing of coating relies on the removal of moisture and not the setting of fly ash, this stiffening of slurry poses a challenge in plant production. Stiffening of coating slurry leads to buildup on the roller coater and slurry delivery system, which makes extended run difficult. It is preferred the coating stays fluid and workable for at least 30 minutes, or at least 60 minutes, without significant stiffening up.

Citric acid was found to be adequate in lab environment to control the slurry set for a reasonable extended time period. However in industrial scale production at elevated temperatures, citric acid itself was found to have limited effect on controlling stiffening of the slurry. There was observed buildup on rollers, which makes it difficult to deliver uniform coating with good coverage. The combination of citric acid or sodium citrate with sodium gluconate was tested at different temperatures, and the mixture has shown to effectively extend the flow time of the slurry and delay stiffening, even at high slurry temperatures. Potassium gluconate, potassium tartrate and sodium tartrate provided extended flow time retention both at ambient and high temperatures. Sodium gluconate can be used alone, or combined with other flow time retention agents. It has particular advantages when combined with at least one of citric acid or sodium citrate. Gluconic acid and tartaric acid also provided extended flow time retention both at ambient and high temperatures. Of the various chemical additives investigated, tartaric acid was found to provide the best flow time retention both at ambient and high temperatures.

Example 1

Three mixtures were prepared using the formulation listed in TABLE 1-1. Fly ash was sieved through #30 mesh (Standard US mesh size) to remove any big lumps and grits. All ingredients other than fly ash were mixed together and treated as total liquids. The fly ash to liquids weight ratio is 2.4 and fly ash to polymer weight ratio is 2.6. PROSIL 9270, a silane to boost water resistance, was added as 1% by weight of fly ash. AQUABLAK 5968 is a carbon black based colorant to give the desired appearance. All three had 0.6% citric acid by weight of fly ash. Mix 2 and 3 had additional 0.25% and 0.5% sodium gluconate (by weight of fly ash) respectively. Citric acid and sodium gluconate were added as powder to the polymer and dissolved well before mixing.

All fly ash and liquids materials were batched and conditioned to 110° F. overnight to achieve a slurry temperature of 110° F. The fly ash was slowly poured into the liquids in a bucket, and stirred at full speed by a drill mixer. After three minutes of mixing, the slurry temperature and viscosity were monitored for two hours. Viscosity was measured using a Sheen cup 400 (see FIG. 4). A Sheen cup is similar to a Ford cup, but with a bigger opening to allow for testing of more viscous materials. The Sheen cup 400 used was model 401/6, BS 3900, A6-1971, with an opening of 7.14 mm. The cup orifice was sealed, usually with a finger, while the slurry was filled flush with the top. The finger seal was then removed and stopwatch was started simultaneously. The time was stopped at the first break in flow. This elapsed time represents the 'flow-time' of the test, or viscosity of the coating slurry. Viscosity usually increases with slurry setting.

TABLE 1-1

Formulation for 2-gallon mix in Example 1

|  | Mix 1<br>0.6% citric acid | Mix 2<br>0.6% citric acid<br>0.25% sodium gluconate | Mix 3<br>0.6% citric acid<br>0.5% sodium gluconate |
|---|---|---|---|
| Scherer C fly ash (−30 mesh) (g) | 7962 | 7962 | 7962 |
| Liquid polymer FORTON VF 774 (g) | 3016 | 3016 | 3016 |
| AQUABLAK 5968 (g) | 36 | 36 | 36 |
| PROSIL 9270 (g)* | 114 | 114 | 114 |
| Citric acid (g)** | 48 | 48 | 48 |
| Sodium gluconate (g) |  | 20 | 40 |

*PROSIL 9270 is 70% active solids, hence, 114 * 0.70/7962 * 100 = 1.0%.
**Citric Acid - 48/7962 * 100 = 0.60%

The initial slurry temperature after mixing was close to 110° F. for all three mixes. The slurry was kept at 70° F. afterwards. The purpose was to simulate plant production at ambient temperature of about 70° F., whereas the initial slurry temperature can be elevated due to close proximity of raw materials to heat sources. The initial Sheen cup flow time reading for Mix 1 with citric acid only was close to 40 seconds (shown in FIG. 4), which is very thick for roller coater application. Mix 2 and 3, with sodium gluconate, had much lower initial Sheen cup flow time reading of 26 seconds. Not only the high initial Sheen cup flow time reading, Mix 1 also showed significantly faster stiffening, reaching 60 seconds after 20 minutes, and 120 seconds after 30 minutes. The slurry was hardly flowable 30 minutes after mixing. By contrast, mix 2 and 3 demonstrated Sheen cup flow time reading of under 40 seconds after 50 minutes, and under 60 seconds after 2 hours. The behavior of mix 2 and 3 is highly desired at the plant, which minimizes the formation of lumps and buildup due to fly ash reaction even at elevated temperature. The dosage of sodium gluconate was found to be not significant. This example showed that the combination of citric acid and sodium gluconate is acts as a very powerful flow time retention agent to slow down the stiffening of mixtures containing class C fly ash, even at high temperatures.

Example 2

Two mixtures were prepared to compare the viscosity development over time when the liquids are chilled from elevated temperature to room temperature. The formulations are very similar to those in Example 1, except 0.3% citric acid and 0.3% sodium gluconate were used, see TABLE 2-1 for details. The fly ash was heated up to 110° F. Citric acid and sodium gluconate were added as powder to the polymer. The liquids were conditioned to 90° F. overnight, and then rapidly chilled to 70° F. in about 15 minutes by ice water, to simulate plant production when rapid chilling is used to control slurry open time. The chilled liquids were mixed with the fly ash to form slurry. The purpose of this test is to simulate slurry stiffening at the plant when chiller is used to cool down the liquids.

TABLE 2-1

Formulation for 2-gallon mix in Example 2

|  | Mix 1<br>0.3% citric acid | Mix 2<br>0.3% citric acid<br>0.3% sodium gluconate |
|---|---|---|
| Scherer C fly ash (−30 mesh) (g) | 7962 | 7962 |
| Liquid polymer FORTON VF 774 (g) | 3016 | 3016 |
| AQUABLAK 5968 (g) | 36 | 36 |
| PROSIL 9270 (g) | 114 | 114 |
| Citric acid (g) | 24 | 24 |
| Sodium gluconate (g) |  | 24 |

Figure 6:
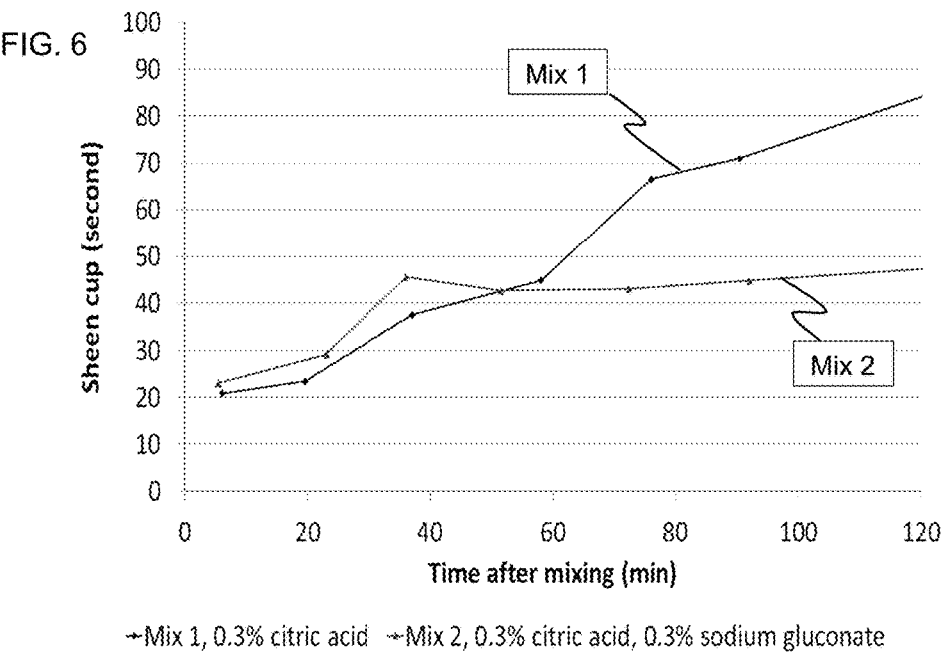
FIG. 6 shows a plot of Sheen cup flow time readings for three mixtures of Example 2.

The initial slurry temperature was about 90° F., and the initial Sheen cup flow time reading was around 20 seconds for both mixes (see FIG. 6). Mix 2 (0.3% citric acid and 0.3% sodium gluconate) had similar stiffening behavior as Mix 1 (0.3% citric acid only) up to 50 minutes, except for the higher 40-minute reading which was probably due to polymer skin over on the surface due to evaporation. After 50 minutes, Mix 2 containing 0.3% citric acid and 0.3% sodium gluconate exhibited obvious advantage with Sheen cup flow time reading under 50 seconds after 2 hours. By comparison, Mix 1 containing 0.3% citric acid only showed significant stiffening reaching Sheen cup flow time reading of 85 seconds after 2 hours.

Example 3

Six mixtures were prepared using the formulations shown in TABLE 3-1. These are small batches being about 10% of the quantity in Example 1 & 2. Mixes 1-3 were based on fly ash (FA) and water, with the water content the same as that in polymer VF774. For example, for a fly ash content of 796 g, 151 g water is present for a polymer content of 302 g (the polymer is 50% solid content). This calculation is based on the assumption that the reaction between fly ash and water is responsible for the stiffening of slurry. Mix 1 was a mixture of fly ash (FA) and water; Mix 2 had 0.3% citric acid; Mix 3 had 0.3% citric acid and 0.3% sodium gluconate. Mixes 4-6 were based on fly ash and VF774 polymer; Mix 5 had 0.3% citric acid; Mix 6 had 0.3% citric acid and 0.3% sodium gluconate. The fly ash to polymer ratio was the same as in Example 1 and 2. Citric acid and sodium gluconate were pre-dissolved in 10 grams of water. The solution was added to the mixing water, followed by hand mixing with the fly ash. All raw materials were kept at room temperature prior to mixing.

After mixing, the slurry (~280 g) was placed in a 6 ounces Styrofoam cup and placed in an insulated STYROFOAM box. The temperature response was measured continuously using a computerized data collection program. The maximum temperature and time to maximum temperature were used as indications of the reactivity of the experimental mixtures.

TABLE 3-1

Formulation for mix in Example 3

|  | Mix 1 FA + water | Mix 2 FA + water; 0.3% citric acid | Mix 3 FA + water; 0.3% citric acid; 0.3% sodium gluconate | Mix 4 FA + polymer | Mix 5 FA + polymer; 0.3% citric acid | Mix 6 FA + polymer; 0.3% citric acid; 0.3% sodium gluconate |
|---|---|---|---|---|---|---|
| Scherer C fly ash (−30 mesh) (g) | 796 | 796 | 796 | 796 | 796 | 796 |
| Mixing water (g) | 151 | 151 | 151 | | | |
| Liquid polymer FORTON VF 774 (g) | | | | 302 | 302 | 302 |
| Citric acid (g) | | 2.4 | 2.4 | | 2.4 | 2.4 |
| Sodium gluconate (g) | | | 2.4 | | | 2.4 |
| Water for citric acid, sodium gluconate solution (g) | | 10 | 10 | | 10 | 10 |

The temperature rise data are shown in FIG. 7(a) for fly ash and water mixes, and FIG. 7(b) for fly ash and polymer mixes. For Mix 1 containing fly ash and water only, the initial mix was very thick due to the low water-to-fly ash ratio of 0.19. After 80 minutes, the temperature peaked at 108° F., showing significant fly ash reaction. The mix was hard and not deformable after 25 minutes. When 0.3% citric acid was added (Mix 2), peak temperature occurrence was drastically delayed to 54 hours, and peaked at 88° F. Mix 2 hardened in a few hours. When both citric acid and sodium gluconate were used (Mix 3), there was almost no peak in temperature rise data, and the mix was still squeezable the next day. This data demonstrate that the combination of citric acid and sodium gluconate is extremely powerful in achieving extended flow time retention and delaying the stiffening of slurry.

FIG. 7(b) for mixes 4-6 shows similar trend for fly ash and polymer mixtures. Mixes 4-6 correspond to Mixes 1-3, except polymer was used instead of water. Mix 4 containing fly ash and polymer peaked at 95° F. after 65 minutes, and the mix hardened within one hour. With 0.3% citric acid (mix 5), peak temperature occurred at 85° F. after 60 hours. For Mix 6 containing both citric acid and sodium gluconate, no temperature peak was obvious for 80 hours.

Example 4

This example is similar to Example 3, except sodium citrate was used to replace citric acid. Sodium citrate has the benefit of being pH neutral, which will not change the pH of the latex film forming polymer. Most latex prefers pH close to 7 or slightly alkaline environment, with low pH causing instability. The particular polymer VF 774 has a pH of 8-10. When mixed with citric acid, the pH goes down to 3.15, which could be a concern if the liquids stay in a tank for extended time. The formulation is shown in TABLE 4-1. Same as in Example 3, sodium citrate and sodium gluconate were pre-dissolved before blended with the polymer. All raw materials were kept at room temperature.

TABLE 4-1

Formulation for mix in Example 4

|  | Mix 1 FA + water | Mix 2 FA + water; 0.3% sodium citrate | Mix 3 FA + water; 0.3% sodium citrate; 0.3% sodium gluconate | Mix 4 FA + polymer | Mix 5 FA + polymer; 0.3% sodium citrate | Mix 6 FA + polymer; 0.3% sodium citrate; 0.3% sodium gluconate |
|---|---|---|---|---|---|---|
| Scherer C fly ash (−30 mesh) (g) | 796 | 796 | 796 | 796 | 796 | 796 |
| Mixing water (g) | 151 | 151 | 151 | | | |
| Liquid polymer FORTON VF774 (g) | | | | 302 | 302 | 302 |
| Citric acid (g) | | 2.4 | 2.4 | | 2.4 | 2.4 |
| Sodium gluconate (g) | | | 2.4 | | | 2.4 |
| Water for citric acid, sodium gluconate solution (g) | | 10 | 10 | | 10 | 10 |

The temperature rise data are shown in FIG. 8 for fly ash and water mixes, and FIG. 9 for fly ash and polymer mixes. For Mix 1, the temperature peaked at 108° F. after 80 minutes, showing significant fly ash reaction. The mix was hard and not deformable after 25 minutes. When 0.3% sodium citrate was added (Mix 2), peak temperature occurrence was delayed to 13.5 hours, and peaked at 115° F. Comparing with Mix 2 in Example 3 where citric acid was used, it seems that citric acid is more powerful than sodium citrate. When both sodium citrate and sodium gluconate were used (Mix 3), there was almost no peak in temperature rise data, and the mix was still squeezable the next day. This data demonstrate the combination of sodium citrate and sodium gluconate is also extremely powerful in achieving extended flow time retention and delaying the stiffening of slurry.

FIG. 9 for mixes 4-6 shows similar trend for fly ash and polymer mixes. Mixes 4-6 correspond to mixes 1-3, except that polymer was used. Mix 5 was very interesting showing double peaks. The first one appeared 8.6 hours after mixing at 87° F., and the second peak occurred after 44 hours at 95° F. For Mix 6 containing both sodium citrate and sodium gluconate, no temperature peak was obvious for 80 hours.

Example 5

An industrial scale plant trial tested a combination including 0.3% sodium citrate and 0.3% sodium gluconate. The formulation is shown in TABLE 5-1 for a liquids batch of approximately 75 gallons. The proportions of each material were the same as in the Examples 3 and 4. The polymer VF774 was first pumped into the mixing tank, followed by PROSIL 9270. Sodium citrate and sodium gluconate was each made into 25% solution by hand. The two solutions as well as the colorant were manually put into the mixing tank and blended. The blended liquids was then pumped to the liquids metering tank, and fed into the mixer. Fly ash was also fed into the mixer.

The mixed slurry was transferred to a cone shape plastic hopper, and pumped to feed the roller coater with four rubber pipes. The ambient temperature was around 78° F. at the time of trial. Fresh slurry samples were collected before the feed to the pump for viscosity and temperature measurements. During the three-hour trial, Sheen cup flow time readings stayed stable at around 11 seconds, and slurry temperature ranged between 78° F. and 83° F. There was no buildup inside the pump or on the roller coater after the three hour trial. A slurry sample was kept overnight for observation, which was still fluid except for a skin on the surface the next day. This trial verified the efficacy of the flow time retention agents at plant production environment.

TABLE 5-1

Formulation for Plant Trial

|  | 0.3% sodium citrate 0.3% sodium gluconate |
| --- | --- |
| Scherer C fly ash (−30 mesh) (lbs) | 1588 |
| Liquid polymer FORTON VF 774 (lbs) | 586.7 |
| AQUABLAK 5968 (lbs) | 7.1 |
| PROSIL 9270 (lbs) | 22.7 |
| Sodium citrate (lbs) | 4.8 |
| Sodium gluconate (lbs) | 4.8 |
| Water for sodium citrate, sodium gluconate solution (lbs) | 38.4 |

The waterproofness of the coated panels of Example 5 was determined in accordance to the ANSI A118.10 standard. The waterproofness test method was modified to make it more aggressive by having a 48" tall water column instead of 24" as prescribed in the ANSI A118.10 standard. The test was initiated and drop in water level in the column was measured as a function of time. After the passage of 48-hours, no change in water level (i.e., 0" drop in water level) was noted thus indicating a high degree of waterproofness of the hydrophobic finish coating and coated panels of this invention.

Example 6

Three mixtures were prepared using the formulation listed in TABLE 6-1. Fly ash was sieved through #30 mesh to remove any big lumps and grits. All ingredients other than fly ash were mixed together and treated as total liquids. The fly ash to liquids weight ratio is 2.0 and fly ash to polymer weight ratio is 2.1. PROSIL 9270 (70% active ingredient), a silane to boost water resistance, was added as 1% by weight of fly ash. AQUABLAK 5968 is a carbon black based colorant to give the desired appearance. Different carboxylic acids were used at 0.3% by weight of fly ash, added as 50% by weight aqueous solution, and blended with other liquids before mixing.

All fly ash and liquids materials were conditioned to 110° F. overnight to achieve a slurry temperature of 110° F. This experiment was used to identify the best chemical additive during summer time, when slurry temperature will be consistently high and extending slurry open time is extremely challenging. The fly ash was slowly poured into the liquids in a bucket, and stirred at full speed by a drill mixer. After three minutes of mixing, the slurry was kept at 110° F. oven and viscosity was monitored until the slurry became so viscous that the viscosity could not be measured by Sheen cup flow time.

TABLE 6-1

Formulations for 2-gallon mix in Example 6

|  | Mix 1 - 0.3% citric acid | Mix 2 - 0.3% tartaric acid | Mix 3 - 0.3% gluconic acid |
| --- | --- | --- | --- |
| Scherer C fly ash (−30 mesh) (g) | 7962 | 7962 | 7962 |
| Liquid polymer FORTON VF 774 (g) | 3791 | 3791 | 3791 |
| AQUABLAK 5968 (g) | 36 | 36 | 36 |
| PROSIL 9270 (g) | 114 | 114 | 114 |
| Citric acid (g) | 24 |  |  |
| Tartaric acid (g) |  | 24 |  |
| Gluconic acid (g) |  |  | 24 |

Figure 10:
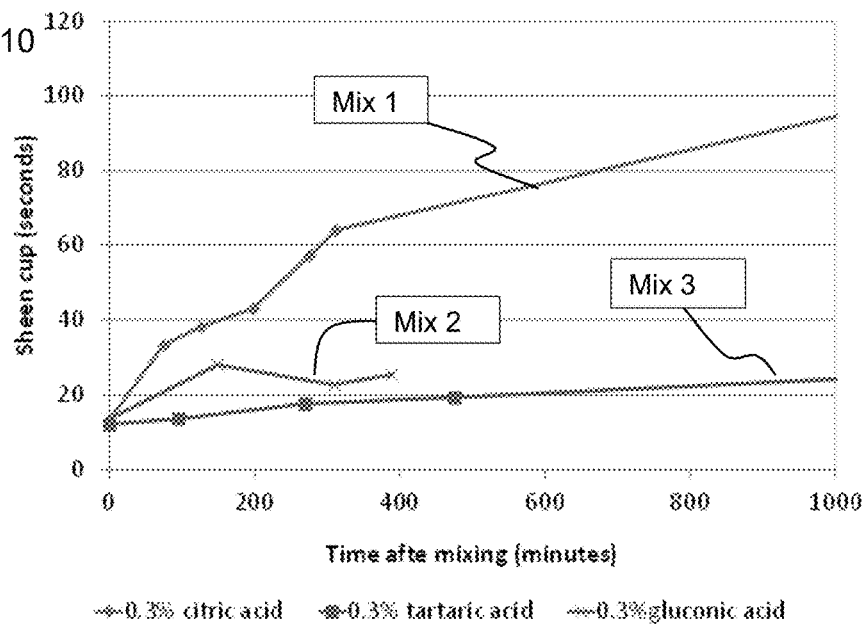
FIG. 10 shows Sheen Cup Flow Time (seconds) versus Slurry Age (minutes) for Example 6.

The Sheen cup flow time readings (seconds) over time after mixing (minutes) are plotted in FIG. 10. The initial Sheen cup flow time readings for all three mixes were similar around 15 seconds. The mixture containing 0.3% gluconic acid (Mix 3) stiffened fast, and turned to thick pastes after 5-6 hours. The mixture containing 0.3% citric acid (Mix 1) showed over 60 seconds Sheen cup flow time at 5 hours, which is thick and difficult to process using industrial manufacturing processes. Mix with tartaric acid exhibited the best flow time retention performance (Mix 2), with the slurry measuring 30 seconds Sheen cup flow time after 24 hours of mixing, and 92 seconds Sheen cup flow time after 6 days in 110° F. oven (not plotted here).

Surface water absorption test, also commonly called Cobb test, was conducted in accordance with ASTM C473 *Physical Testing of Gypsum Panel Products*. The specification is water absorption of not more than 0.5 g after 2 hours of elapsed time in accordance with ASTM C1178 *Coated Glass Mat Water-Resistant Gypsum Backing Panel*. The test evaluates the water-repellent surfaces by damming a specific area on the treated surface, filling that area with water for 2 hours, and measuring the weight gain after test. The specific area exposed to water is defined by a Cobb ring of enclosed area of 15.5 in$^2$ (100 cm$^2$) and 1 in tall (2.54 cm). The test specimens are 5 in. (12.7 cm) square and before initiating the test they are conditioned in 70±5° F. (21±2° C.) and 50±2% relative humidity atmosphere until constant weight is attained within 0.1%.

The samples used for surface water absorption test were prepared in the lab by manually coating glass-mat gypsum baseboard. The tool used is known as the "Magic Trowel" (by TexMaster Tools), similar to a squeegee. The desired amount of coating at 125 lb/msf was applied uniformly on the board and air dried subsequently.

TABLE 6-2 shows the surface water absorption results.

TABLE 6-2

|  | Mix 1 - 0.3% citric acid | Mix 2 - 0.3% tartaric acid | Mix 3 - 0.3% gluconic acid |
| --- | --- | --- | --- |
| Surface water absorption (grams) as a function of carboxylic acid type | 0.19 | 0.24 | 0.37 |

There is a significant difference in water absorption performance among samples containing different carboxylic acids, even though all met the less than 0.5 gram specification ASTM C1178. The slurry containing 0.3% citric acid showed the best performance of 0.19 gram (Mix 1), which was half of the slurry contained gluconic acid (Mix 3). The samples containing tartaric acid provided 0.24 gram water absorption (Mix 2). Combining this with the viscosity measurement, tartaric acid demonstrated the best overall performance, followed by citric acid.

The waterproofness of the coated panels of Example 6 was determined in accordance to the ANSI A118.10 standard. The waterproofness test method was modified to make it more aggressive by having a 48" tall water column instead of 24" as prescribed in the ANSI A118.10 standard. The test was initiated and drop in water level in the column was measured as a function of time. After the passage of 48-hours, no change in water level (i.e., 0" drop in water level) was noted thus indicating a high degree of waterproofness of the hydrophobic finish coating and coated panels of this invention.

Example 7

The procedure of Example 6 was repeated with three mixtures prepared using the formulation listed in TABLE 7-1. Different sodium salts of carboxylic acids were used at 0.3% by weight of fly ash, added as 50% by weight aqueous solution and blended with other liquids before mixing.

TABLE 7-1

Formulations for 2-gallon mix in Example 7

|  | Mix 1 - 0.3% sodium citrate | Mix 2 - 0.3% sodium gluconate | Mix 3 - 0.3% sodium tartrate |
|---|---|---|---|
| Scherer C fly ash (−30 mesh) (g) | 7962 | 7962 | 7962 |
| Liquid polymer FORTON VF 774 (g) | 3791 | 3791 | 3791 |
| AQUABLAK 5968 (g) | 36 | 36 | 36 |
| PROSIL 9270 (g) | 114 | 114 | 114 |
| Sodium citrate (g) | 24 | | |
| Sodium gluconate (g) | | 24 | |
| Sodium tartrate (g) | | | 24 |

Figure 11:
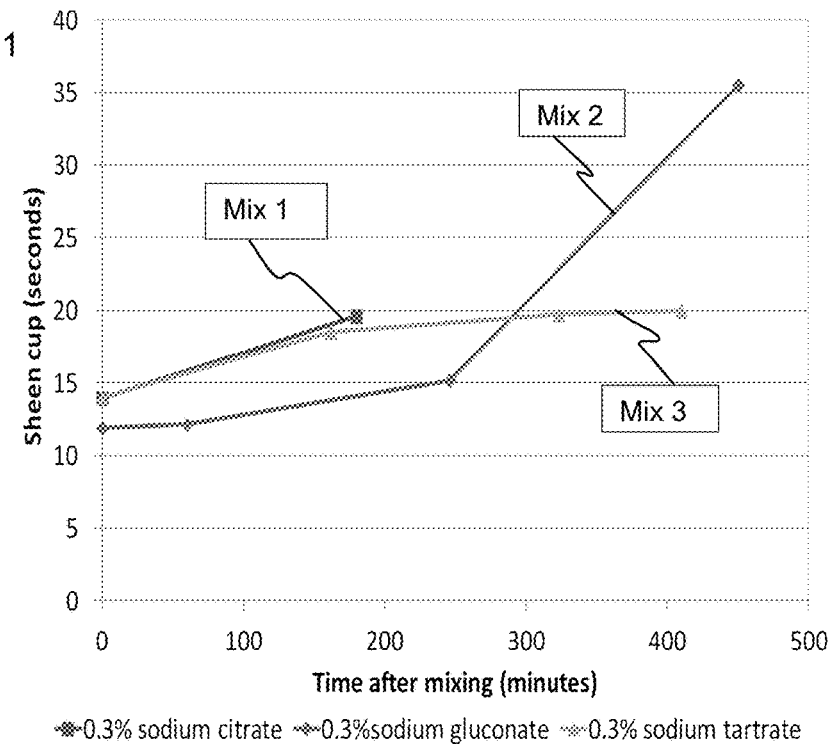
FIG. 11 shows Sheen Cup Flow Time (seconds) versus Slurry Age (minutes) data for Example 7.

The Sheen cup flow time readings are plotted in FIG. 11. Mix 1 containing sodium citrate showed the weakest effect on flow time retention, with the mixture gelling up after 5 hours of mixing and not as effective as citric acid shown in the previous sample. Mix 2 containing 0.3% sodium gluconate showed very slow stiffening up to 4 hours, followed by significant increase in viscosity, reaching 35 seconds flow time at 6 hours. After that the slurry got so thick that Sheen cup flow time could not be measured. Mix 3 containing sodium tartrate demonstrated the best flow time retention performance among the three, with the slurry being very fluid at about 20 seconds flow time after 7 hours. After that some big spheres started to appear in the sample, an indication of some reactions occurring in the material and potential buildup issues in a continuous commercial manufacturing process. Sodium tartrate also showed a weaker flow time retention performance than tartaric acid.

The samples used for surface water absorption test were prepared in the lab by manually coating glass-mat gypsum baseboard using "Magic Trowel" (by TexMaster Tools). The desired amount of coating of 125 lb/msf was applied uniformly on the board and air dried subsequently. TABLE 7-2 shows surface water absorption results, with all results between 0.30-0.40 grams.

TABLE 7-2

|  | Mix 1 - 0.3% sodium citrate | Mix 2 - 0.3% sodium gluconate | Mix 3 - 0.3% sodium tartrate |
|---|---|---|---|
| Surface water absorption (grams) as a function of carboxylic acid salt type | 0.39 | 0.31 | 0.34 |

Each sodium salt of carboxylic acid showed a higher water absorption than its acid counterpart. It is desirable to have as low water absorption as possible so that there is sufficient margin to failure, considering the potential variations occurring in industrial production processes.

Example 8

The procedure of Example 6 was repeated with three mixtures prepared using the formulation listed in TABLE 8-1. Different potassium salts of carboxylic acids were used at 0.3% by weight of fly ash, added as 50% by weight aqueous solution and blended with other liquids before mixing.

TABLE 8-1

Formulations for 2-gallon mix in Example 8

|  | Mix 1 - 0.3% potassium citrate | Mix 2 - 0.3% potassium gluconate | Mix 3 - 0.3% potassium tartrate |
|---|---|---|---|
| Scherer C fly ash (−30 mesh) (g) | 7962 | 7962 | 7962 |
| Liquid polymer FORTON VF 774 (g) | 3791 | 3791 | 3791 |
| AQUABLAK 5968 (g) | 36 | 36 | 36 |
| PROSIL 9270 (g) | 114 | 114 | 114 |
| Potassium citrate (g) | 24 | | |
| Potassium gluconate (g) | | 24 | |
| Potassium tartrate (g) | | | 24 |

Figure 12:
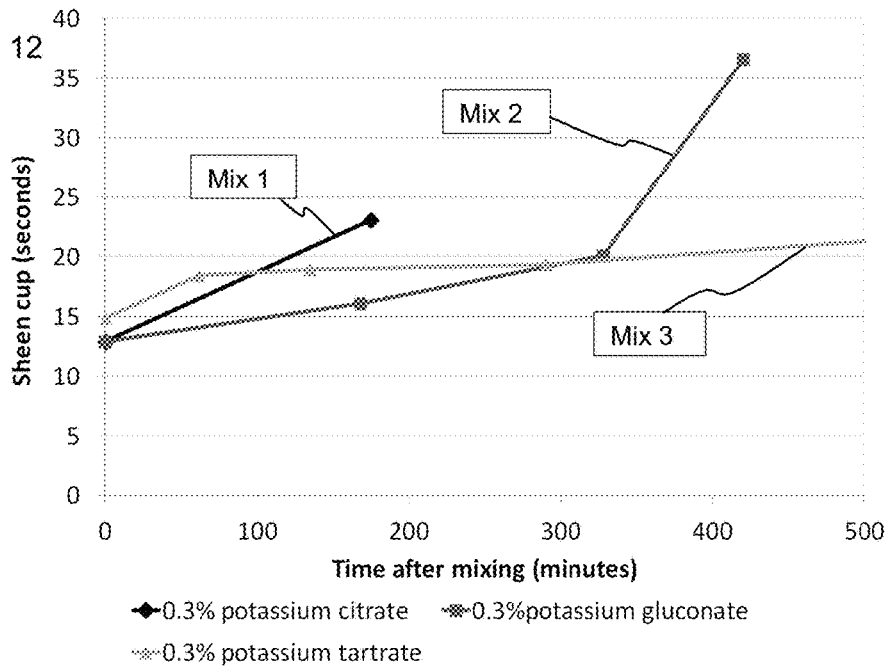
FIG. 12 shows Sheen Cup Flow Time (seconds) versus Slurry Age (minutes) for Example 8

The Sheen cup flow time readings are shown in FIG. 12 Mix 1 containing potassium citrate performed very similarly to sodium citrate and gelled after 3 hours. Mix 2 containing potassium gluconate also mirrored its sodium counterpart, with the slurry showing slow stiffening up to 6 hours, and rapid thickening afterwards. Mix 3 containing potassium tartrate performed the best in this group, and better than sodium tartrate, with the slurry measuring 32 seconds Sheen cup flow time after 24 hours (not plotted here)

The samples used for surface water absorption test were prepared in the lab by manually coating glass-mat gypsum baseboard using "Magic Trowel" (by TexMaster Tools). The desired amount of coating of 125 lb/msf was applied uniformly on the board and air dried subsequently. TABLE 8-2 shows surface water absorption results very similar to the sodium salts of the same carboxylic acid, with all three mixtures between 0.30-0.40 grams.

TABLE 8-2

|  | Mix 1 - 0.3% potassium citrate | Mix 2 - 0.3% potassium gluconate | Mix 3 - 0.3% potassium tartrate |
|---|---|---|---|
| Surface water absorption (grams) as a function of carboxylic acid salt type | 0.36 | 0.32 | 0.37 |

Example 9

The procedure of Example 6 was repeated with four mixtures prepared using the formulation listed in TABLE 9-1. However, combinations of two salts of carboxylic acids or a combination of a carboxylic acid and a salt of carboxylic acid were used in each mixture. These carboxylic acid-based chemical additives were first prepared into a 25% by weight aqueous solution and the prepared solution was blended with other liquids before mixing with the fly ash.

TABLE 9-1

Formulations for 2-gallon mix in Example 9

|  | Mix 1 0.3% sodium citrate + 0.3% sodium gluconate | Mix 2 0.3% potassium citrate + 0.3% potassium gluconate | Mix 3 0.3% citric acid + 0.3% sodium gluconate | Mix 4 0.3% citric acid + 0.15% potassium tartrate |
|---|---|---|---|---|
| Scherer C fly ash (−30 mesh) (g) | 7962 | 7962 | 7962 | 7962 |
| Liquid polymer FORTON VF 774 (g) | 3791 | 3791 | 3791 | 3791 |
| AQUABLAK 5968 (g) | 36 | 36 | 36 | 36 |
| PROSIL 9270 (g) | 114 | 114 | 114 | 114 |
| Sodium citrate (g) | 24 | | | |
| Sodium gluconate (g) | 24 | | 24 | |
| Potassium citrate (g) | | 24 | | |
| Potassium gluconate (g) | | 24 | | |
| Citric acid (g) | | | 24 | 24 |
| Potassium tartrate (g) | | | | 12 |

Figure 13:
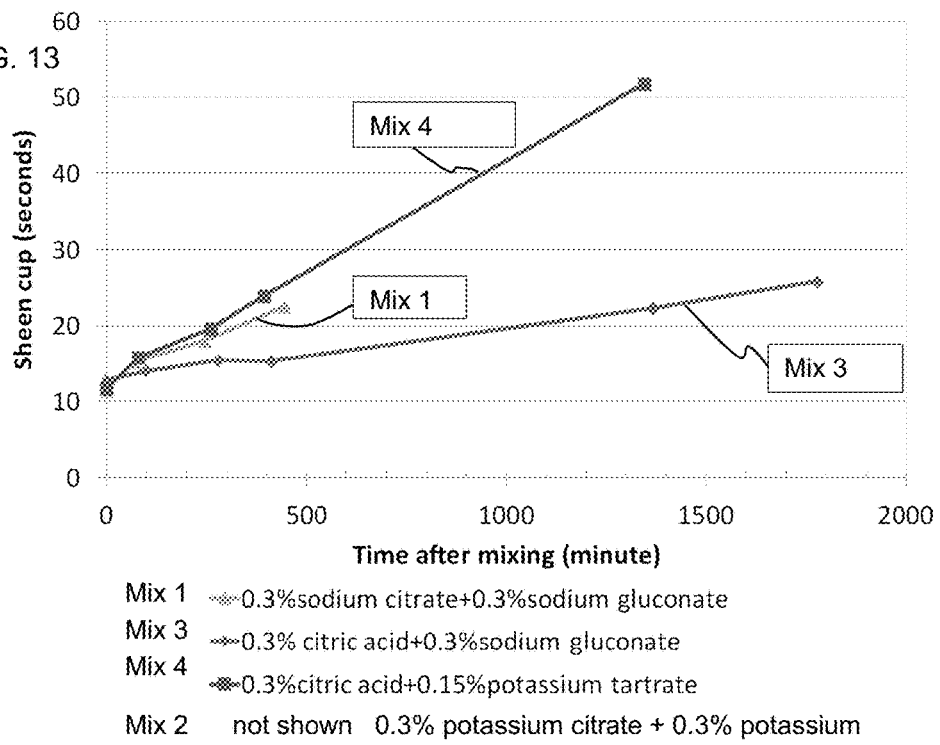
FIG. 13 shows Sheen Cup Flow Time (seconds) versus Slurry Age (minutes) of Example 9.

FIG. 13 shows the Sheen cup flow time readings. Mix 1 (0.3% sodium citrate+0.3% sodium gluconate) showed slightly improved open time compared to each individual component, measuring 22 seconds Sheen cup flow time after 7 hours. Mix 2 (0.3% potassium citrate+0.3% potassium gluconate) is not shown. Mix 3 (0.3% citric acid+0.3% sodium gluconate) showed extremely extended open time of 25 seconds after 27 hours. This is significantly improved over each individual component, showing synergy between the two chemical additives. Mix 4 (0.3% citric acid+0.15% potassium tartrate) showed improved open time compared to each individual component.

TABLE 9-2 shows the surface water absorption results.

TABLE 9-2

|  | Mix 1 - 0.3% sodium citrate + 0.3% sodium gluconate | Mix 2 - 0.3% potassium citrate + 0.3% potassium gluconate | Mix 3 - 0.3% citric acid + 0.3% sodium gluconate | Mix 4 - 0.3% citric acid + 0.15% potassium tartrate |
|---|---|---|---|---|
| Surface water absorption (grams) as a function of mixtures of carboxylic acid based chemical additives | 0.55 | 0.56 | 0.44 | 0.45 |

The two mixtures (mixes 1 & 2) containing two salts of carboxylic acids did not meet the less than 0.5 gram specification per ASTM C1178. The two mixtures containing the combination of a carboxylic acid and a salt of carboxylic acid (mixes 3 and 4) passed marginally. This demonstrates combinations of the shown chemical additives are relatively less desirable for products needing to comply with ASTM C1178.

Example 10

The procedure of Example 6 was repeated with two mixtures prepared using the formulation listed in TABLE 10-1. Mix 1 had tartaric acid at 0.3% by weight of fly ash, with tartaric acid added as 50% by weight aqueous solution, and blended with other liquids before mixing. Mix 2 had an additional polycarboxylate ether based superplasticizer at 1% by weight of fly ash. The superplasticizer used was SIKA VISCOCRETE G2 with 40% solid content. The objective of this investigation was to determine the effect of polycarboxylate ether superplasticizer, a chemical derived from carboxylic acid family, on slurry viscosity and flow time.

All fly ash and liquids materials were at room temperature of about 70° F. The fly ash was slowly poured into the liquids in a bucket, and stirred at full speed by a drill mixer. After three minutes of mixing, the slurry was kept at 70° F., and viscosity was measured by Sheen cup flow time. TABLE 10-1 shows formulations for 2-gallon mix in Example 10.

TABLE 10-1

Formulations for 2-gallon mix in Example 10

| | Mix 1<br>0.2% tartaric acid | Mix 2<br>0.2% tartaric acid,<br>1% superplasticizer |
|---|---|---|
| Scherer C fly ash (−30 mesh) (g) | 7962 | 7962 |
| Liquid polymer FORTON VF 774 (g) | 3791 | 3791 |
| AQUABLAK 5968 (g) | 36 | 36 |
| PROSIL 9270 (g) | 114 | 114 |
| Tartaric acid (g) | 16 | 16 |
| Sika VISCOCRETE G2 (g) | | 200 |

The Sheen cup flow time for mix 1 was measured at 11 seconds after completion of mixing. Surprisingly, the Sheen cup flow time for mix 2 was measured at 40 seconds. This result was unexpected since polycarboxylate ether based superplasticizers are known in the art (Portland cement and concrete industry) for action on reducing viscosity and imparting superior flow to cement slurry mixtures. This result demonstrates not all chemicals derived from carboxylic acid family work in a similar fashion as the preferred carboxylic acids and salts of carboxylic acids of this invention.

All references, including publications, ASTM and ANSI standards, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A hydrophobic finish composition comprising:
   (i) hydraulic component comprising fly ash, the fly ash comprising Class C fly ash in an amount from about 50% to about 85% by weight of the hydrophobic finish composition on a water inclusive basis;
   (ii) film-forming polymer;
   (iii) at least one silane compound selected from the group consisting of:
      (a) silane compounds having a molecular weight of at least about 150,
      (b) silane compounds having a general chemical formula (I):

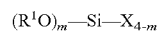 (I)

wherein $R^1O$ is an alkoxy group, X is an organofunctional group, and m ranges from 1 to 3, and
      (c) mixtures of silane compounds (a) and (b); and (iv) an extended flow time retention agent comprising at least one member selected from the group consisting of carboxylic acids, salts of carboxylic acids, and mixtures thereof;

wherein said carboxylic acids have the chemical formula (II):

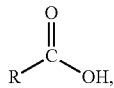
(II)

wherein R is an organofunctional group;

wherein the salts of carboxylic acid have the chemical formula (III)

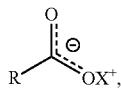
(III)

wherein R is as defined in formula (II) and $X^+$ is a cation.

2. The hydrophobic finish composition of claim 1, wherein the carboxylic acids or salts of carboxylic acids are not a polycarboxylate superplasticizer.

3. The hydrophobic finish composition of claim 1, having an absence of polycarboxylate ether.

4. The hydrophobic finish composition of claim 1, wherein the extended flow time retention agent comprises citric acid or a citric acid salt.

5. The hydrophobic finish composition of claim 1, wherein the extended flow time retention agent is at least one member selected from the group consisting of tricarboxylic acids, dicarboxylic acids, sugar acids, aldonic acids, aldaric acids, uronic acids, aromatic carboxylic acids, amino carboxylic acids, alpha hydroxy acids, beta hydroxy acids, sodium salts of said acids, and potassium salts of said acids.

6. The hydrophobic finish composition of claim 1, wherein the film-forming polymer comprises at least one member selected from the group consisting of acrylic polymers and copolymers, rubber-based polymers and copolymers, styrene-butadiene rubber, copolymers of styrene and acrylic, copolymers of vinyl acetate and ethylene, copolymers of vinyl chloride and ethylene, copolymers of vinyl acetate and vinyl ester of versatic acid, copolymers of vinyl laurate and ethylene, terpolymers of vinyl acetate, ethylene and methylmethacrylate, terpolymers of vinyl acetate, ethylene and vinyl laurate, terpolymers of vinyl acetate, ethylene and vinyl ester of versatic acid, and any combination thereof.

7. The hydrophobic finish composition of claim 1, wherein the silane compound is in an amount from about 0.1% to about 5% by weight of the wet finish and the extended flow time retention agent is in an amount from about 0.05% to 1.00% by weight of the hydraulic component, wherein the silane compound has a molecular weight of at least about 150, or wherein the silane compound has the general chemical formula (I):

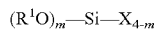
(I), wherein $R^1O$ is the alkoxy group, X is the organofunctional group, and m ranges from 1 to 3.

8. The hydrophobic finish composition of claim 1, wherein the carboxylic acids or salts of carboxylic acids are selected from the group consisting of dicarboxylic acids, tricarboxylic acids, salts of dicarboxylic acids, and salts of tricarboxylic acids.

9. The hydrophobic finish composition of claim 1, wherein
the Class C fly ash is about 55% to about 75% by weight of the hydrophobic finish composition based on the weight of the finish composition including water;
the film-forming polymer is about 7.5% to about 22.5% by weight of the hydrophobic finish composition based on the weight of the hydrophobic finish composition including water;
the silane compound is 0.1% to 3% by weight of the hydrophobic finish composition based on the weight of the hydrophobic finish composition including water; and
the extended flow time retention agent is 0.075% to 0.75% by weight of the hydraulic component on a dry basis.

10. The hydrophobic finish composition of claim 1, wherein the carboxylic acids and/or salts of carboxylic acids used as extended flow time retention agents are other than copolymerizable unsaturated carboxylic acids and/or salts of copolymerizable unsaturated carboxylic acids of structural formula (V):

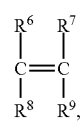
(V)

wherein $R^6$, $R^7$, and $R^8$ are H or substituted or unsubstituted functional groups, and $R^9$ is a functional group containing a carboxyl group (C(O)OH), or polymerized versions thereof.

11. An article comprising:
a cementitious layer; and
the hydrophobic finish composition of claim 1 facing the cementitious layer.

12. The article of claim 11, wherein the cementitious layer on a dry basis is 50 wt. % or greater gypsum and/or 20 wt. % or greater Portland cement.

13. A mat-faced cementitious board comprising:
a cementitious core;
a fibrous mat having an inner surface facing at least one face of the cementitious core, and an opposite outer mat surface; and
the hydrophobic finish composition of claim 1 facing the opposite outer mat surface of the fibrous mat.

14. The board of claim 13,
(a) wherein the cementitious core is a gypsum-based core;
(b) wherein the fibrous mat comprises polymer or mineral fiber, wherein the fibrous mat has the inner surface facing at least one face of the gypsum-based core, and the opposite outer mat surface; and
(c) wherein the hydrophobic finish composition facing the opposite outer mat surface of the fibrous mat comprises:
(i) the hydraulic component comprising Class C fly ash,
(ii) one or more of the following said film-forming polymers: acrylic polymers and copolymers, rubber-based polymers and copolymers, styrene-butadiene rubber, copolymers of styrene and acrylic, copolymers of vinyl acetate and ethylene, copolymers of vinyl chloride and ethylene, copolymers of vinyl acetate and vinyl ester of versatic acid, copolymers of vinyl laurate and ethylene, terpolymers of vinyl acetate, ethylene and methylmethacrylate, terpolymers of vinyl acetate, ethylene and vinyl laurate, terpolymers of vinyl acetate, ethylene and vinyl ester of versatic acid, and any combination thereof, wherein the film-forming polymer is in an amount from about 5% to about 25% by weight of the wet finish,
(iii) the alkoxysilane comprises an alkyl alkoxysilane in an amount from about 0.1% to about 5% by weight of the wet finish, and
(iv) the extended flow time retention agent comprises one or more carboxylic acids, salts of carboxylic acids, or mixtures thereof.

15. The board of claim 13, wherein the board is selected from the group consisting of a gypsum mat faced board, wherein the cementitious core is a gypsum based core comprising more than 50 wt. % gypsum on a water free basis and a cement mat faced board, wherein the cementitious core is a cement based core comprising more than 20 wt. % Portland cement on a water free basis.

16. A process for making the cementitious board of claim 13, comprising:
preparing a mat-faced cementitious board comprising the cementitious core and the fibrous mat, wherein the mat has an inner surface adjacent to a cementitious core first surface and an opposite outer mat surface; and
applying an aqueous composition comprising the hydrophobic finish composition to the opposite outer mat surface to form the mat-faced cementitious board.

17. A mat-faced cementitious board comprising:
a cementitious core;
a fibrous mat having an inner surface facing at least one face of the cementitious core, and an opposite outer mat surface; and
the hydrophobic finish composition of claim 1 facing the opposite outer mat surface of the fibrous mat,
wherein the layer of the hydrophobic finish composition is on the outer surface of the fibrous mat and the cementitious core is adjacent the inner surface of the fibrous mat.

18. The board of claim 17, wherein the fibrous mat comprises a glass mat substrate having non-woven glass fibers bound together by a binder, wherein the board is selected from the group consisting of a gypsum mat faced board, wherein the cementitious core is a gypsum based core comprising more than 50 wt. % gypsum on a water free basis and a cement mat faced board, wherein the cementitious core is a cement based core comprising more than 20 wt. % Portland cement on a water free basis.

19. A hydrophobic finish composition comprising:
(i) hydraulic component comprising fly ash, the fly ash comprising Class C fly ash in an amount from about 50% to about 85% by weight of the hydrophobic finish composition on a water inclusive basis;
(ii) film-forming polymer;
(iii) 5% by weight or less, based on the weight of the finish composition on a wet basis, at least one silane compound selected from the group consisting of:
(a) silane compounds having a molecular weight of at least about 150,
(b) silane compounds having a general chemical formula (I):

$(R^1O)_m$—Si—$X_{4-m}$ (I)

wherein $R^1O$ is an alkoxy group, X is an organofunctional group, and m ranges from 1 to 3, and
(c) mixtures of silane compounds (a) and (b); and
(iv) an extended flow time retention agent comprising at least one member selected from the group consisting of carboxylic acids, salts of carboxylic acids, and mixtures thereof;
wherein said carboxylic acids have the chemical formula (II):

wherein R is an organofunctional group;
wherein the salts of carboxylic acid have the chemical formula (III)

wherein R is as defined in formula (II) and $X^+$ is a cation.

20. An article comprising:
a cementitious layer; and
the hydrophobic finish composition of claim 19 facing the cementitious layer.

21. The hydrophobic finish composition of claim 19, wherein the extended flow time retention agent is at least one member selected from the group consisting of tricarboxylic acids, dicarboxylic acids, sugar acids, aldonic acids, aldaric acids, uronic acids, aromatic carboxylic acids, amino carboxylic acids, alpha hydroxy acids, beta hydroxy acids, sodium salts of said acids, and potassium salts of said acids.

22. The hydrophobic finish composition of claim 19, wherein the film-forming polymer comprises at least one member selected from the group consisting of acrylic polymers and copolymers, rubber-based polymers and copolymers, styrene-butadiene rubber, copolymers of styrene and acrylic, copolymers of vinyl acetate and ethylene, copolymers of vinyl chloride and ethylene, copolymers of vinyl acetate and vinyl ester of versatic acid, copolymers of vinyl laurate and ethylene, terpolymers of vinyl acetate, ethylene and methylmethacrylate, terpolymers of vinyl acetate, ethylene and vinyl laurate, terpolymers of vinyl acetate, ethylene and vinyl ester of versatic acid, and any combination thereof.

23. The hydrophobic finish composition of claim 19, wherein the carboxylic acids or salts of carboxylic acids are selected from the group consisting of dicarboxylic acids, tricarboxylic acids, salts of dicarboxylic acids, and salts of tricarboxylic acids.

24. The hydrophobic finish composition of claim 19, wherein
the Class C fly ash is about 55% to about 75% by weight of the hydrophobic finish composition based on the weight of the finish composition including water;

the film-forming polymer is about 7.5% to about 22.5% by weight of the hydrophobic finish composition based on the weight of the hydrophobic finish composition including water;

the silane compound is 5% by weight or less of the hydrophobic finish composition based on the weight of the hydrophobic finish composition including water; and the extended flow time retention agent is 0.075% to 0.75% by weight of the hydraulic component on a dry basis.

25. A mat-faced cementitious board comprising:

a cementitious core;

a fibrous mat having an inner surface facing at least one face of the cementitious core, and an opposite outer mat surface; and the hydrophobic finish composition of claim 19 facing the opposite outer mat surface of the fibrous mat.

26. A process for making the cementitious board of claim 25, comprising:

preparing a mat-faced cementitious board comprising the cementitious core and the fibrous mat, wherein the mat has an inner surface adjacent to a cementitious core first surface and an opposite outer mat surface; and applying an aqueous composition comprising the hydrophobic finish composition to the opposite outer mat surface to form the mat-faced cementitious board.

* * * * *